United States Patent [19]
Nagashige et al.

[11] Patent Number: 5,892,958
[45] Date of Patent: Apr. 6, 1999

[54] PERIPHERAL EQUIPMENT CONTROL DEVICE

[75] Inventors: Yukari Nagashige; Shoichi Miyazawa; Kunio Watanabe, all of Yokohama; Kouji Shida; Shinichi Kojima, both of Takasaki, all of Japan

[73] Assignee: Hitachi, Ltd., Tokyo, Japan

[21] Appl. No.: 757,318

[22] Filed: Nov. 27, 1996

Related U.S. Application Data

[63] Continuation of Ser. No. 540,940, Oct. 11, 1995, which is a continuation of Ser. No. 279,051, Jul. 22, 1994, Pat. No. 5,479,619, Division of Ser. No. 795,697, Nov. 21, 1991, Pat. No. 5,361,364.

[30] Foreign Application Priority Data

Nov. 22, 1990 [JP] Japan ................................. 2-318450
Nov. 30, 1990 [JP] Japan ................................. 2-328903

[51] Int. Cl.$^6$ .................................................. G06F 1/32
[52] U.S. Cl. ................................ 395/750.05; 365/227
[58] Field of Search .......................... 395/750, 750.05; 365/227, 226; 364/707

[56] References Cited

U.S. PATENT DOCUMENTS

| | | |
|---|---|---|
| 4,317,181 | 2/1982 | Teza . |
| 4,365,290 | 12/1982 | Nelms et al. . |
| 4,409,665 | 10/1983 | Tubbs . |
| 4,612,418 | 9/1986 | Takeda et al. . |
| 4,698,748 | 10/1987 | Juzswik et al. . |
| 4,747,041 | 5/1988 | Engel et al. . |
| 4,920,339 | 4/1990 | Friend et al. . |
| 5,029,284 | 7/1991 | Feldbaumer et al. . |
| 5,041,964 | 8/1991 | Cole et al. . |
| 5,239,559 | 8/1993 | Brach et al. . |
| 5,239,658 | 8/1993 | Yamamuro et al. . |
| 5,276,889 | 1/1994 | Shiraishi et al. ................ 395/750 |
| 5,309,569 | 5/1994 | Warchol . |
| 5,313,595 | 5/1994 | Lewis et al. . |
| 5,361,364 | 11/1994 | Nagashige et al. . |
| 5,392,437 | 2/1995 | Matter et al. . |
| 5,396,635 | 3/1995 | Fung ................................... 395/800 |
| 5,457,790 | 10/1995 | Iwamura et al. . |
| 5,521,768 | 5/1996 | Shrinkle et al. ................... 360/69 |

OTHER PUBLICATIONS

Circus Logic, "CL–SH370 Product Bulletin", Jan., 1991.
"Product Specification of Small Hard Disk Drive DRR040C", (first edition), issued by Alps Electric Co. Ltd..

*Primary Examiner*—Glenn A. Auve
*Attorney, Agent, or Firm*—Fay, Sharpe, Beall, Fagan, Minnich, & McKee

[57] ABSTRACT

A peripheral equipment control LSI interposed between an SCSI bus connected to a main CPU and peripheral equipment such as a file device. The LSI is divided into two major blocks. One block recognizes an SCSI protocol ID signal sent over the SCSI bus. The other block generates a signal that causes the other block to leave a sleep state (low power dissipation mode). In a state in which a command is awaited from the main CPU, the peripheral equipment control LSI allows the block containing the ID recognition part to remain active while the other block is kept in the sleep state. On receiving an ID-based selected (access) signal from the main CPU, the LSI detects the start of an access operation and causes the other block to leave its sleep state and to become active.

18 Claims, 17 Drawing Sheets

PERIPHERAL EQUIPMENT CONTROL DEVICE

This application is a continuation of U.S. application Ser. No. 08/540,940, filed on Oct. 11, 1995 which is a continuation of U.S. applicaion Ser. No. 08/279,051, filed on Jul. 22, 1994, now U.S. Pat. No. 5,479,619 which is a divisional of U.S. Ser. No. 07/795,697, filed on Nov. 21, 1991, now U.S. Pat. No. 5,361,364.

BACKGROUND OF THE INVENTION

The present invention relates to structural improvements for lower power dissipation of peripheral equipment for use with workstations and personal computers. More particularly, the invention relates to structural improvements for lower power dissipation of semiconductor integrated circuits within peripheral equipment control devices.

Heretofore, various proposals have been made to reduce power dissipation not only in peripheral equipment for workstations and personal computers but also in LSI's (large scale integrated circuits) for control over such equipment.

For a first prior art example, take some peripheral control LSI's having an input terminal dedicated to specify low power dissipation mode. Receiving signals from an external microprocessor or a power dissipation controller through such dedicated terminal, this type of LSI maintains low power dissipation mode during designated periods. That is, part or all of the clock pulses are stopped during designated periods for those digital circuits in a peripheral control LSI which operate on a reference clock signal. The result is a reduced level of power dissipation. In another arrangement, the power from a current source circuit is also cut off to part or all of the analog circuits in the peripheral control LSI during designated periods. This further lowers the power dissipation involved.

For a second prior art example, take such peripheral equipment as a hard disk unit, CD ROM (compact disk read only memory) or floppy disk unit which may be constructed for reduced power dissipation with smaller size and less weight. As described in the Product Specification of Small Hard Disk Drive DRR040C (first edition) issued by Alps Electric Co., Ltd., the above construction involves having the peripheral equipment receive commands from a host computer (microprocessor, etc.) and execute them only when so designated.

FIG. 18 schematically shows the DRR040C as typical prior art peripheral equipment. The DRR040C comprises disks 1801 which are magnetic media; heads 1802 that read magnetically recorded information from the disks 1801; a head actuator 1803 that moves the heads 1802 to a target position on the disks 1801; a spindle motor 1804 that rotates the disks 1801; an actuator control circuit 1805 that controls the operation of the head actuator 1803; a CPU (central processing unit) 1806 that controls the whole operation of the DRR040C; a spindle motor control circuit 1807 that controls the spindle motor 1804 in accordance with control signals from the CPU 1806; a digital-to-analog converter 1808 that converts to analog format the digital information coming from the CPU 1806 and forwards the converted information to the actuator control circuit 1805; a read/write circuit 1810 that shapes in waveform the signal read from the heads 1802 for conversion to a pulse train; a hard disk controller 1811 that converts to parallel data the pulse train generated by the read/write circuit 1810; an analog-to-digital converter 1809 that converts to digital format the head position and other analog information detected by the read/write circuit 1810 and sends the converted information to the CPU 1806; a buffer 1813 that temporarily accommodates signals from the disks 1801 or from an AT bus 1812 in order to adjust the difference in read rate between the AT bus 1812 and the disks 1801; and an AT bus control circuit 1814 that controls the AT bus 1812 under direction of the CPU 1806. It is to be noted that the AT bus is a bus having the PT/AT (a registered trademark of International Business Machines Corp.) Interface.

When not receiving a command from the AT bus neither not executing it, The DRR040C operates as follows so as to reduce power dissipations:

1. When the command from the AT bus is complete, the DRR040C enters idle mode (1). In idle mode (1), the CPU 1806 of the DRR040C stops the hard disk controller 1811 and cuts off power to the read/write circuit 1810.

2. If not accessed from the AT bus within 5 seconds after entering idle mode (1), the DRR040C enters idle mode (2). In idle mode (2), the CPU 1806 of the DRR040C cuts off power to the actuator control circuit 1805, to the digital-to-analog converter 1808 and to the analog-to-digital converter 1809.

3. If not accessed from the At bus within a certain period of time (default is 3 minutes) after entering idle mode (2), the DRR040C enters standby mode. In standby mode, the CPU 1806 of the DRR040C cuts off power to the spindle motor control circuit 1807 and the spindle motor 1804. The CPU 1806 also enters sleeping state.

4. Upon receipt of a sleep command from the AT bus, the DRR040C enters sleep mode, which is a fully low power dissipation mode. On entering sleep mode, DRR040C causes the AT bus control circuit 1814 to leave stanby mode and to enter sleeping state. In sleep mode, the DRR040C accepts no commands from the AT bus; only a reset can activate the drive.

Operating in the manner described, the DRR040C reduces power dissipation while not receiving commands from its host computer and neither executing them.

In the first prior art example, lower-power dissipation mode is designated by a microprocessor or controller external to the peripheral control LSI. This means that to implement minimum power dissipation requires the external microprocessor or its equivalent to issue a low power dissipation mode command a number of times. One disadvantage of this scheme is that the burden on the microprocessor tends to be too heavy.

In addition, the external microprocessor or its equivalent cannot grasp precisely what is taking place within the peripheral control LSI that designates low power dissipation. This is where another disadvantage of the scheme is recognized; the inability of the microprocessor accurately to grasp the internal LSI operations makes it impossible to control them in a delicate manner required to achieve minimum power dissipation.

In the second prior art example, there is no consideration for the current consumed by the AT bus control circuit 1814 in stanby mode. This leaves room for an increase in power dissipation. In sleep mode, which is a fully low power dissipation mode, no commands are accepted; only a reset from the host computer or its equivalent activates the drive. This neglect for the responsive characteristic of the drive is liable to increase the overhead of the host computer.

SUMMARY OF THE INVENTION

It is therefore an object of the present invention to provide structural improvements for low power dissipation not only in peripheral equipment but also in the control device that controls such equipment.

It is another object of the invention to provide a peripheral equipment control LSI that achieves minimum power dissipation while reducing the burden on an external processor or its equivalent associated with the LSI.

It is a further object of the invention to provide a peripheral equipment control device that eliminates power dissipation in a state where a command is awaited from an external processor or the like.

It is an even further object of the invention to provide a peripheral equipment control device that remains highly responsive even as it reduces power dissipation in a state where a command is awaited from an external processor or its equivalent.

It is another object of the invention to provide an SCSI (Small Computer System Interface) control LSI capable of readily reducing current dissipation in an SCSI system.

In carrying out the invention and according to one aspect thereof, there is provided a peripheral equipment control device connected to a bus to which is connected such external processing means as a processor, the peripheral equipment control device comprising access start detecting means for detecting the start of an access operation from the external processing means; access end detecting means for detecting the end of the access operation; and power dissipation controlling means for causing low power dissipation mode to be left in response to an output from the access start detecting means and causing that mode to be entered in response to an output from the access end detecting means.

The external processing means gains access to the peripheral equipment control device when setting a command thereto or when detecting the status thereof.

According to the invention, the peripheral equipment control device or peripheral equipment control LSI remains in low power dissipation mode when waiting for a command from its host computer (e.g., external microprocessor). On receiving a command from the host computer or upon being accessed for status detection, the control device or LSI leaves low power dissipation mode. In this manner, the cumulative, wasteful power dissipation in the control device or LSI is minimized and significantly low power dissipation is attained.

The access start detecting means, access end detecting means and power dissipation controlling means are located inside the peripheral equipment control device or peripheral equipment control LSI. The peripheral equipment control device is a control device for peripheral equipment associated with a main CPU. Illustratively, this type of control device includes a file controller, a display controller, a keyboard controller, a printer controller and a communications controller. The peripheral equipment control LSI is a semiconductor integrated circuit acting in the same manner as the peripheral equipment control device.

The power dissipation controlling means according to the invention cuts off power, in a low power dissipation mode, to the clock source of digital circuits or to analog circuits in major parts of the control device or LSI. This causes the major parts of the control device or LSI to stop operating and keeps them in low power dissipation state. When the host computer or main CPU initiates access such as setting of a command or detection of status to the control device or LSI, the access start detecting means, which is in constant operation, detects the start of such access. In response to the detection, the power dissipation controlling means causes the control device or LSI to leave low power dissipation mode. When the end of such access is detected by the access end detecting means, the power dissipation controlling means again causes low power dissipation mode to be entered accordingly.

According to the invention, furthermore, in SCSI system wherein the host computer or main CPU is connected to peripheral equipment via an SCSI bus, the access start detecting means acts as ID recognizing means. This recognizing means detects that the peripheral equipment control device or LSI is selected by the host computer or main CPU.

That is, the invention separates the SCSI ID recognizing means from other function blocks in the SCSI system. In command wait state or other appropriate state, the other function blocks are placed in sleep mode. This provides easy reductions of power dissipation in the SCSI system.

The above description outlining the invention has been made for illustrative purposes only and is not intended to be limitative thereof. Further objects, features and advantages of the invention will become more apparent upon a reading of the following description and appended drawings.

DETAILED DESCRIPTION OF THE PREFERRED EMBODIMENTS

Preferred embodiments of the invention will now be described in detail with reference to the accompanying drawings.

Figure 3:
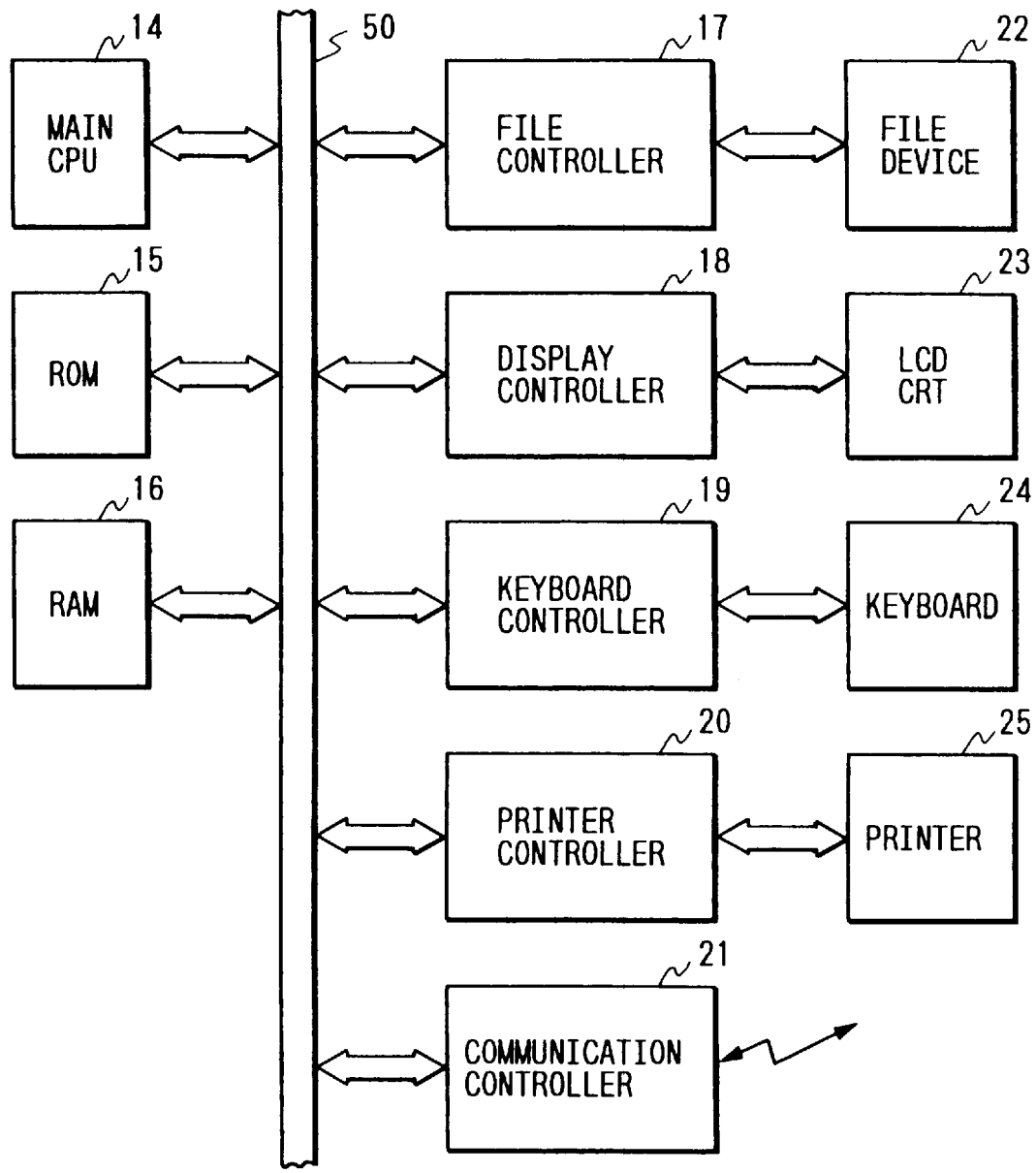
FIG. 3 is a block diagram of a data processor incorporating a peripheral equipment control device or peripheral equipment control LSI embodying the invention.

FIG. 3 shows a typical data processor incorporating a peripheral equipment control device or peripheral equipment control LSI embodying the invention. This type of data processor, used illustratively in a workstation or a personal computer, has a main CPU 14, a ROM 15 and a RAM 16 connected to a bus 50. The bus 50 is connected with a file controller 17, a display controller 18, a keyboard controller 19, a printer controller 20 and a communication controller 21. The controllers 17, 18, 19, 20 and 21 are in turn connected respectively to a file device 22, an LCD or CRT display 23, a keyboard 24, a printer 25, and a communication line, not shown.

In such data processor, the peripheral control device or LSI is any of the file controller 17, display controller 18, keyboard controller 19, printer controller 20 and communication controller 21.

Figure 1:
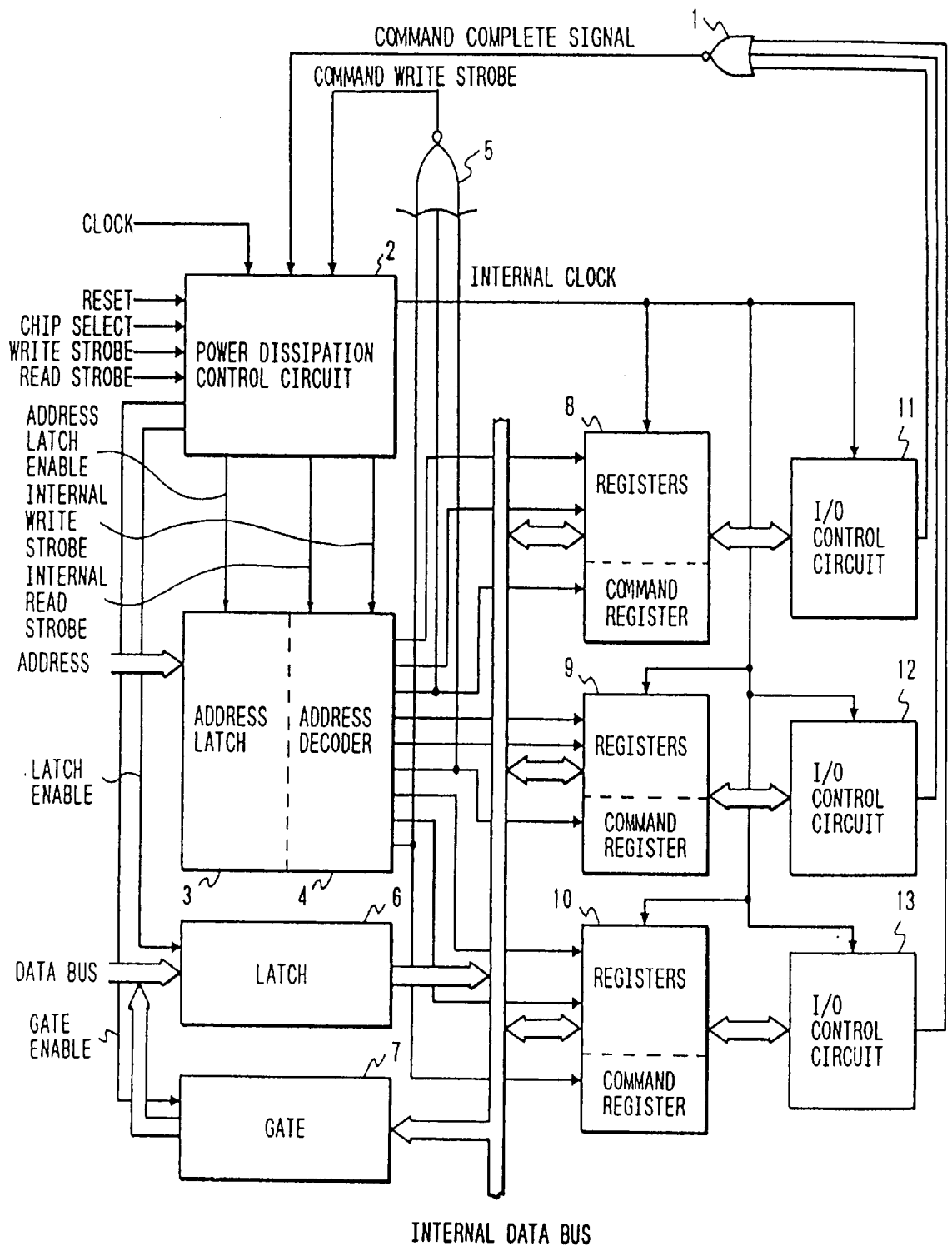
FIG. 1 is a circuit block diagram of a peripheral equipment control device practiced as a first embodiment of the invention.

FIG. 1 is a circuit block diagram of a peripheral equipment control device or a single-chip peripheral equipment control LSI practiced as the first embodiment of the invention. In FIG. 1, a power dissipation control circuit 2 stops internal clock pulse generation when the control device or LSI is not receiving any command from or otherwise accessed by the main CPU 14 over the bus 50. That is, the power dissipation control circuit 2 stops the operation of registers 8 through 10 and I/O control circuits 11 through 13 and places them in sleep mode to lower power dissipation. In that sense, the power dissipation control circuit 2 acts as power dissipation controlling means which also comprises the function of access start detecting means. At this point, the power dissipation control circuit 2, an address latch 3, a latch 6 an address decoder 4 and Gate 5 are in constant operation.

Later, upon receipt of a command from a main CPU 1806, the power dissipation control circuit 2 detects the start of that command (i.e., access) on the basis of a chip select or write strobe signal from the main CPU or of an output from an address decoder 4 or from a gate 5. Then the power dissipation circuit 2 resumes supply of the internal clock signal to the registers 8 through 10 and the I/O control circuits 11 through 13.

Given the internal clock signal, the registers 8 through 10 and the I/O control circuits 11 through 13 are activated. The command retained by the latch 6 is moved to command registers included among the registers 8 through 10. This allows the command from the main CPU 1806 to be executed. After the command has been processed, the I/O control circuits 11 through 13 send a command end signal to a NOR gate 1 that acts as access end detecting means. In turn, an output of the NOR gate 1 is input to the power dissipation control circuit 2. Thus the control circuit 2 again stops the internal clock pulse output and returns to low power dissipation mode.

If the peripheral equipment control device or LSI is accessed by the main CPU 14 for something other than command setting, the power dissipation control circuit 2 detects the start of an access operation, renders the control LSI or the control device operable and leaves low power dissipation mode, all based on a chip select signal, a write strobe signal or a read strobe signal. It is to be noted that the address latch 3, a latch 6, an address decoder 4 and Gate 5 are in constant operation. Write data are introduce inside through the latch 6 while read data are output to the outside via the gate 7. Because this intermittent kind of access is noted for its short duration per cycle, the end of such access is detected by the access end detecting means and low power dissipation mode is again entered accordingly.

Figure 2:
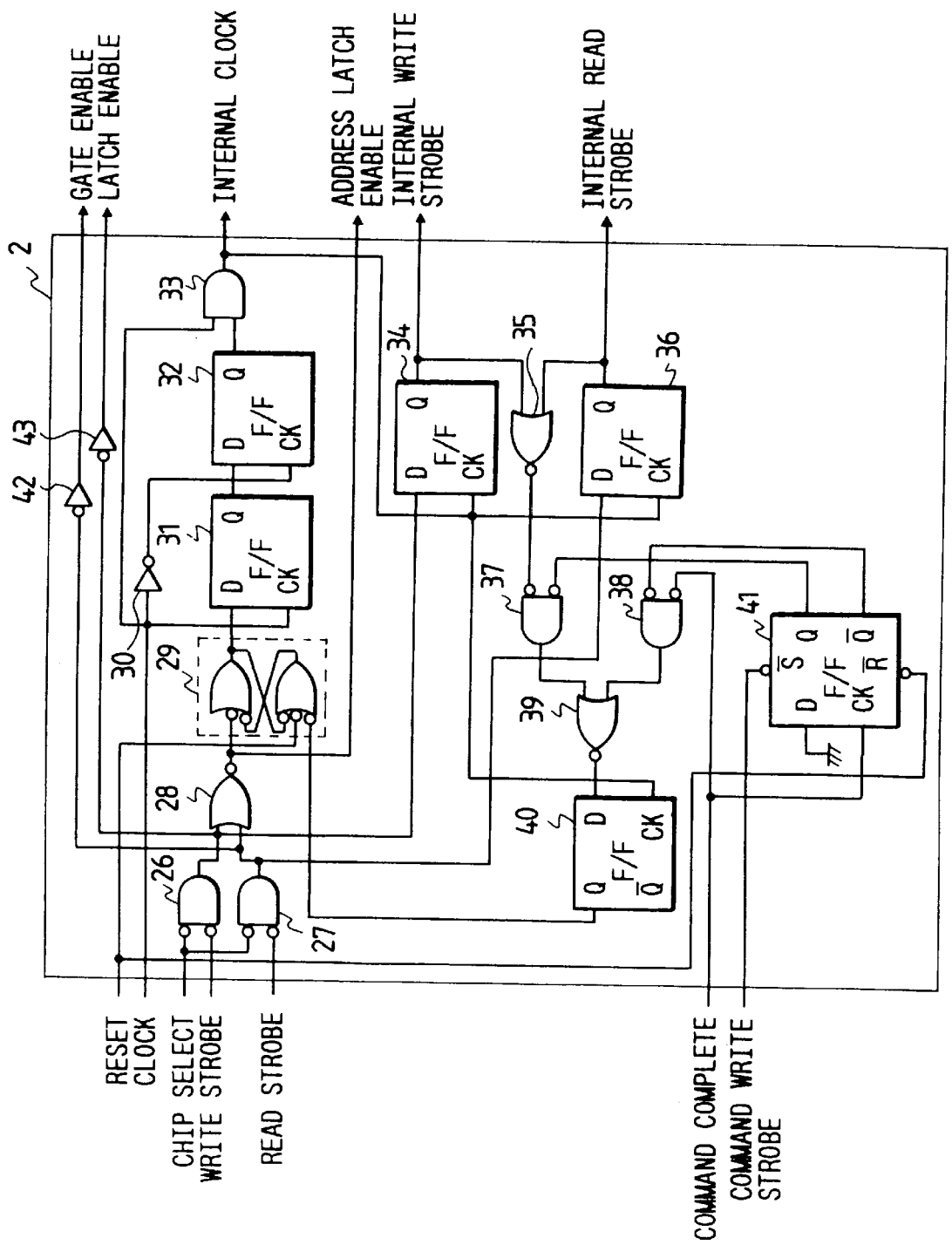
FIG. 2 is a circuit diagram of a power dissipation control circuit 2 contained in the first embodiment.
Figure 4:
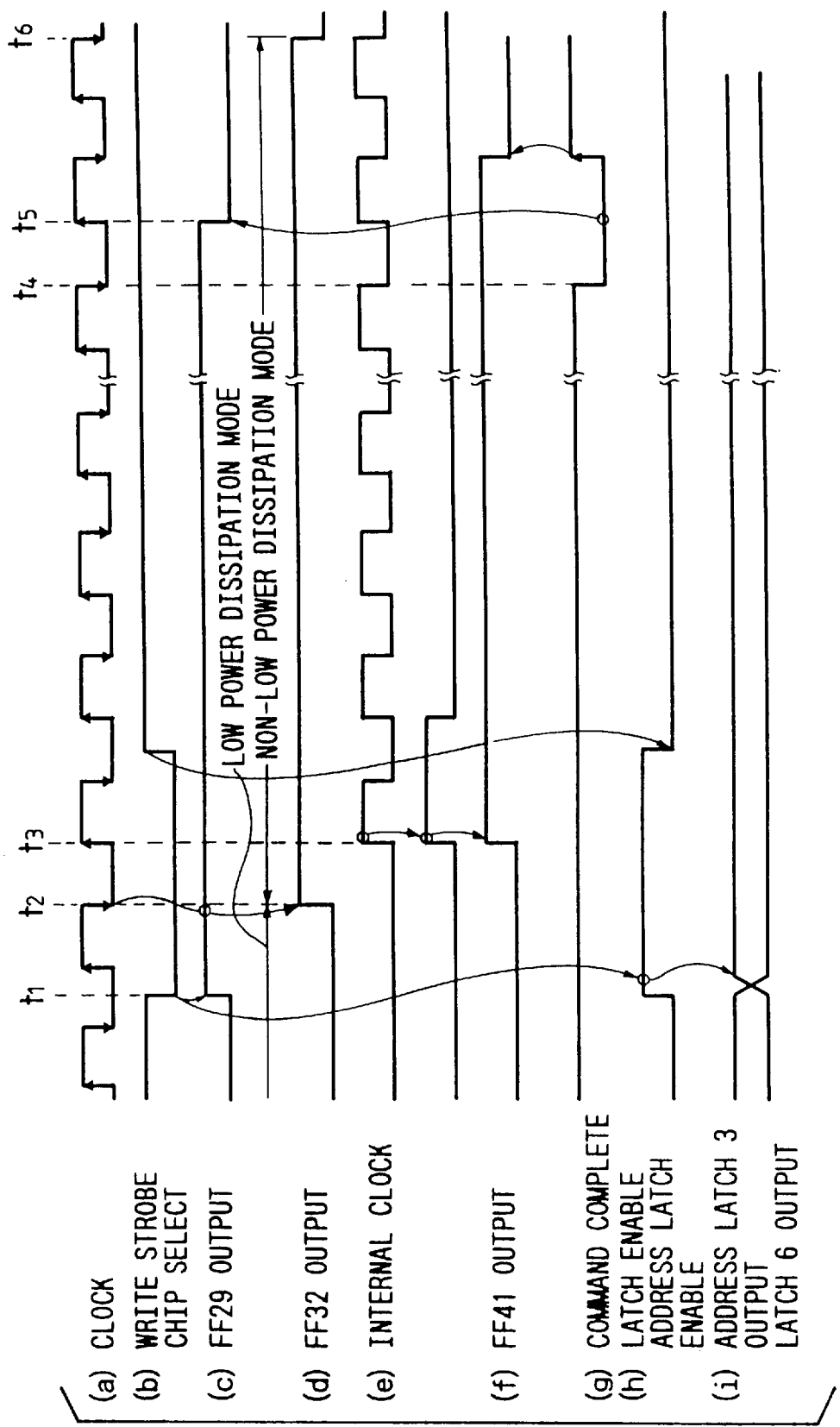
FIGS. 4 and 5 are timing charts describing how the first embodiment of FIG. 1 operates.

Below is a description of how the power dissipation control circuit 2 is constructed and operated with reference to the block diagram of FIG. 2 as well as to te timing charts of FIGS. 4 and 5. The main CPU 14 sends an address or command data along with such control signals as chip select and write strobe to the power dissipation control circuit 2. In turn, the power dissipation control circuit 2 sets an RS flip-flop 29 via gates 26 and 28 at a time t1 in accordance with the chip select and write strobe signals, as shown in FIG. 4.

At this point, a latch enable signal from a gate 43 causes the latch 6 to retain the command data. Likewise, an address latch enable signal from the gate 28 causes the address latch 3 to retain the address. The output of the RS flip-flop 29 is made periodical by edge trigger flip-flops 31 and 32. The output of the flip-flop 32, in turn, activates the internal clock via a gate 33, and causes low power dissipation mode to be left at a time t2.

Then an internal write strobe signal is output by the flip-flop 34. A command write strobe signal is input to a flip-flop 41 via the address decoder 4 at a time t3. At this point, the command write strobe signal moves the command retained by the latched 6 to the command registers among the registers 8 and 9. This starts the processing of the I/O control circuits 11 through 13. The output of the flip-flop 41 brings about a state in which a command end signal may be accepted via the gate 1 of the I/O control circuits 11 through 13.

At the end of the command processing by each of the I/O control circuits 11 through 13, the command end signal passes through the gate 1 and enters a gate 38 of the power dissipation control circuit 2 at a time t4. This causes the RS flip-flop 29 to be reset at time t5 via a gate 39 and a flip-flop 40. The output of the gate 29 controls the gate 33 via the flip-flop 31 and 32, stops the internal clock signal, and causes low power dissipation mode to be entered again at a time t6.

Figure 5:
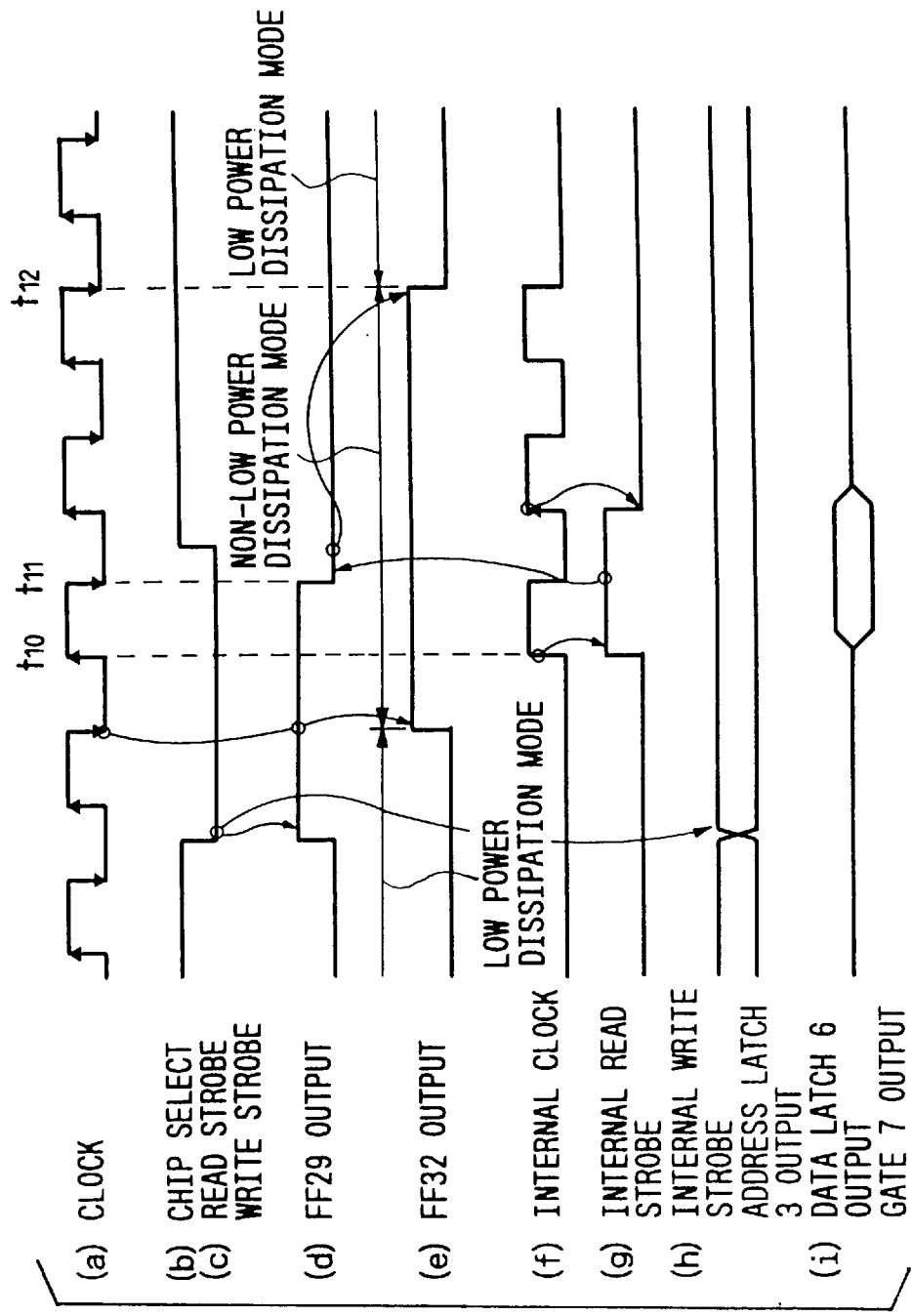

What follows is a description of how access operations other than command setting are carried out in connection with the main CPU 14, with reference to FIG. 5. The sequence of leaving low power dissipation mode is the same as that in FIG. 4. The sequence of returning to that mode is as follows: First, either the internal write strobe signal, which is the output of the flip-flop 34 in FIG. 2, or an internal hard strobe signal, which is the output of a flip-flop 36, is asserted at a time t10. This causes the RS flip-flop 29 to be reset at a time t11 via the gates 35, 37 and 39 as well as via the flip-flop 40, as depicted in FIG. 5. The output of the RS flip-flop 29 controls the gate 33 through the flip-flops 31 and 32, stops the internal clock, and causes low power dissipation mode to be entered again at a time t12. That is, in the first embodiment, the flip-flops 34, 36 and 40 as well as the gates 35, 37, 38 and 39 act as the access end detecting means.

The description above of the first embodiment has centered on how to reduce power dissipation in the digital circuits. Power dissipation in analog circuits may be lowered by cutting off the current source within these circuits by use of the output of the flip-flop 32 or the RS flip-flop 29 in FIG. 2.

The second embodiment of the invention will now be described in detail with reference to FIG. 6 and subsequent figures. The second embodiment is a system in which the invention is applied to the SCSI (Small Computer System Interface). The SCSI system has an SCSI bus utilized as the bus 27 (FIG. 3) to which the above-described peripheral equipment and peripheral equipment control device are connected.

A typical prior art SCSI control LSI for SCSI bus control is found in NCR Corporation's 53C90A and 53C90B Advanced SCSI Controller Data Sheet. This LSI has no consideration for low power dissipation. For the basic SCSI bus protocol, reference should be made illustratively to the SCSI-2 proposal submitted to ANSI (American National Standards Institute) in Mar. 9, 1990.

Figure 6:
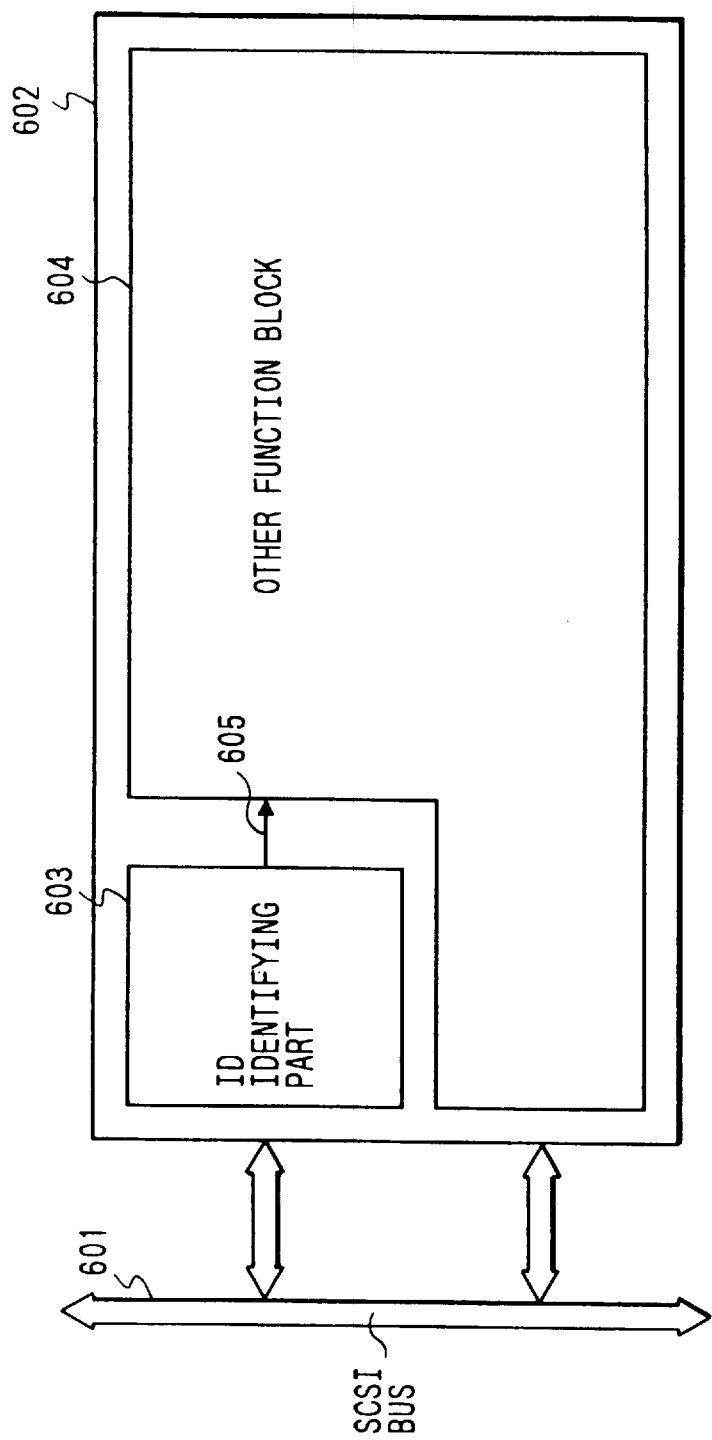
FIG. 6 is a schematic view depicting an SCSI system practiced as a second embodiment of the invention.

FIG. 6 schematically depicts an SCSI system practiced as the second embodiment of the invention. In FIG. 6, the SCSI system comprises an SCSI bus 601 and an SCSI controller 602. The SCSI controller 602 is separated from and independent of an SCSI ID recognition part 603 and other function block 604 in terms of power supply. The function block 604 has a sleep function. Reference numeral 605 indicates a sleep leave signal which indicates a start of access. As will be described later, the function block 604 discontinues its clock signal input and enters sleep mode (i.e., low power dissipation mode) when execution of all commands in the command queue is completed. Thus the SCSI system, in command wait state, stops its operation and dissipates no power except in the ID recognition part 603. In this manner, minimum power dissipation is achieved.

The ID recognition part 603 has a function of detecting whether or not the SCSI system is selected by another SCSI system via the SCSI bus. That is, the ID recognition part 603 acts as the access start detecting means. When the part 603 detects that the SCSI system is selected by another SCSI system, the part 603 supplies the function block 604 with a sleep leave signal for activating part or all of the minimally required circuits. That is, clock pulses are input to these minimally required circuits for their activation. With the ID recongnition part 603 and the function block 604 using a separate power supply each, the function block 604 has its power supply cut off when entering sleep mode. The function block 604 is again connected to its power supply upon receipt of the sleep leave signal 605 from the ID recognition part 603. In this manner, the power consumption in sleep mode is minimized.

The SCSI control LSI in the second embodiment contains a sleep mode entry register or receives an input signal for entry into sleep mode. When the LSI has a sleep mode set value set to its sleep mode entry register or has the sleep mode entry signal asserted, the entire circuit except for the ID recognition part 603 enters sleep mode. On receiving a sleep leave signal from the ID recognition part 603, the SCSI control LSI causes each circuit block to leave sleep mode in accordance with the value set to the register. The register value is used to manage sleep leave information for each circuit block. This scheme minimized current dissipation depending on the selection status of the ID recognition part 603 and on the system configuration. As described, the SCSI control LSI has the sleep leave signal 605 output by the ID recognition part 603 toward an external circuit in addition to ordinary interrupt signals. When the ID recognition part 603 detects that the SCSI control LSI is selected by another SCSI system, the part 603 asserts the external circuit sleep leave signal 605. This causes the other function block 604, disconnected from power in a state awaiting command input from another SCSI system, to be connected again to its power supply circuit so that the block immediately leaves sleep state with ease.

Figure 7:
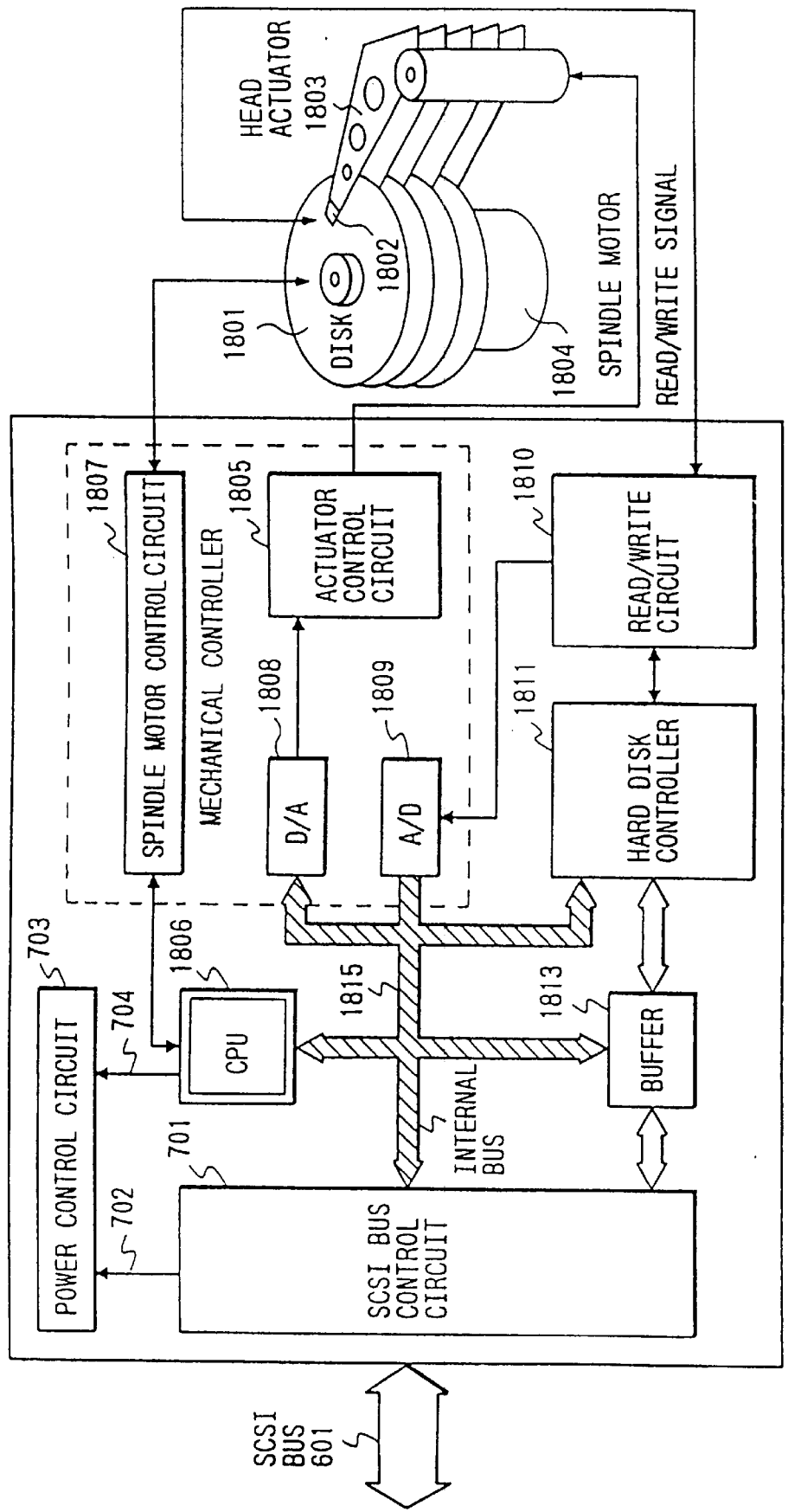
FIG. 7 is a schematic diagram illustrating how the SCSI system as the second embodiment is applied to a hard disk drive.
Figure 18:
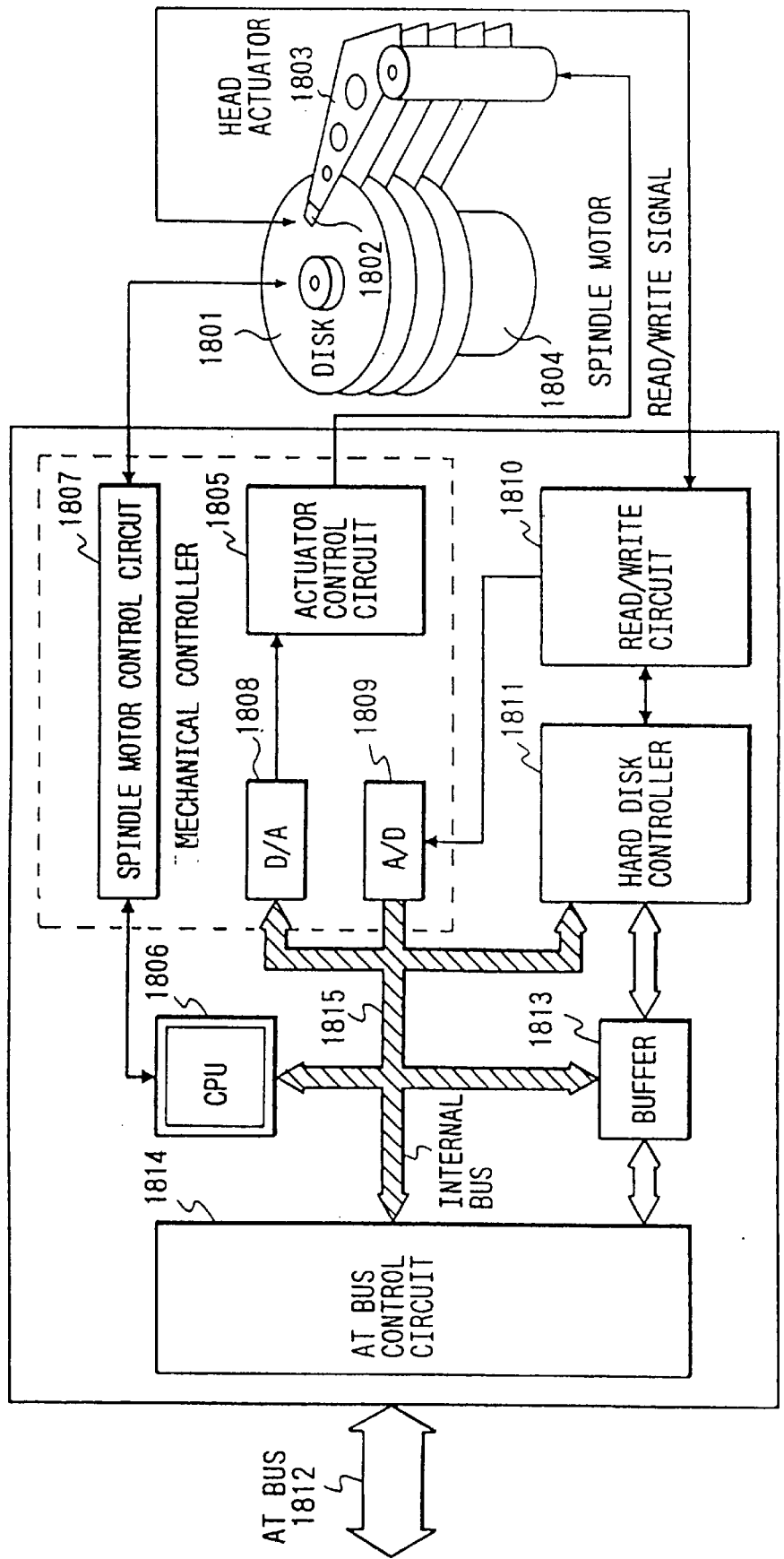
FIG. 18 is a schematic view of a hard disk drive employing a prior art AT bus.

FIG. 7 is a schematic diagram illustrating how the SCSI system as the second embodiment is applied to a particular apparatus. In FIG. 7, reference numerals 1801 through 1813 designate like parts in the prior art construction of FIG. 18 and any repetitive description thereof will be omitted. Newly added components include an SCSI bus control circuit 701 and a power control circuit 703, the latter acting as power dissipation controlling means. The SCSI bus control circuit 701 controls the SCSI bus 601 under direction of the internal CPU 1806. Upon receipt of a sleep signal 704 given by the CPU 1806, the power control circuit 703 cuts off power to all circuits except for a portion of the SCSI bus control circuit 701. On receiving a sleep leave signal 702 output by the SCSI bus control circuit 701, the power control circuit 703 resumes power supply to the internal CPU 1806, SCSI bus control circuit 701 and buffer 1813.

Figure 8:
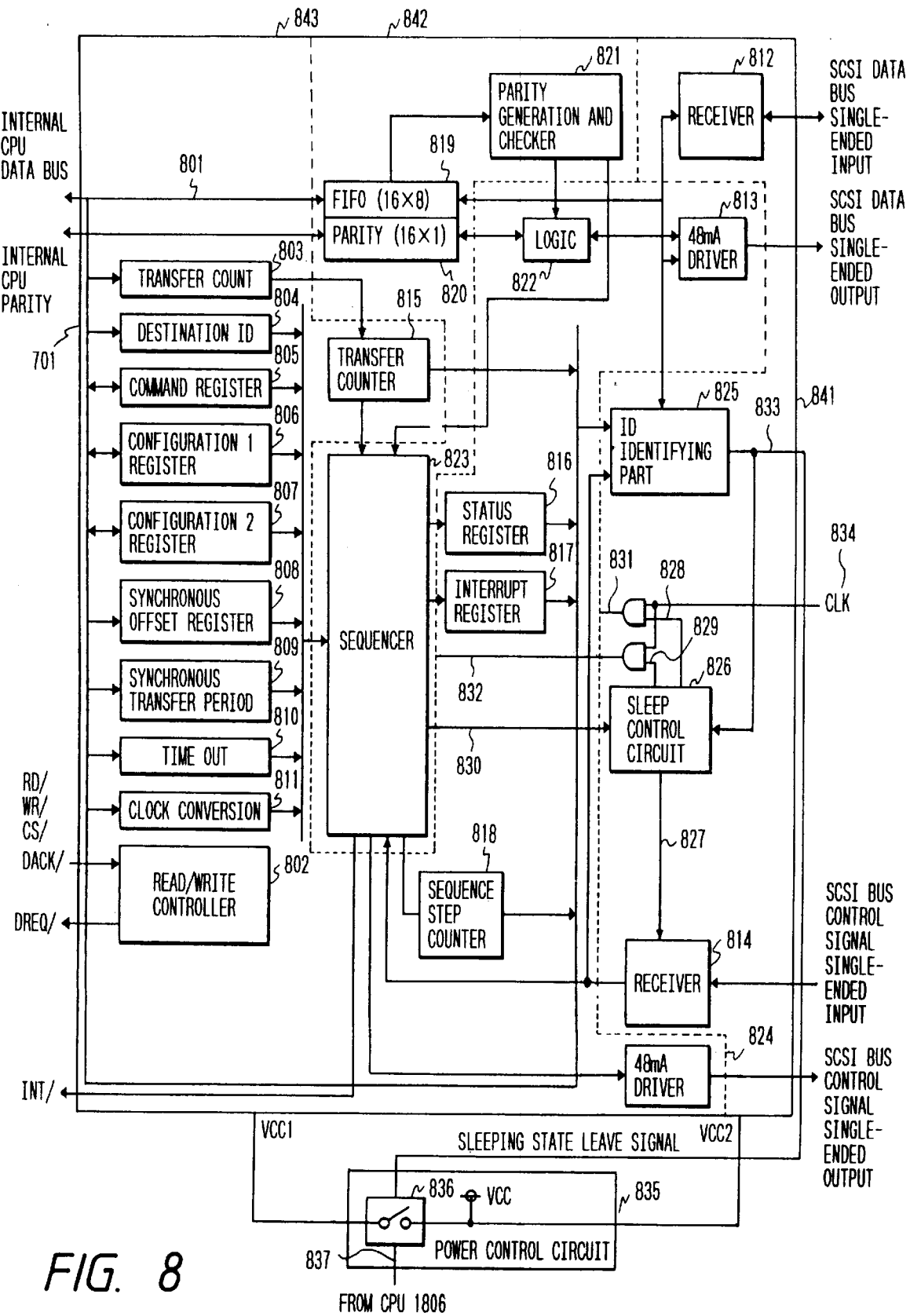
FIG. 8 is a circuit block diagram of an SCSI bus control circuit 701 contained in the second embodiment of FIG. 7.

FIG. 8 is a circuit block diagram of an SCSI bus control circuit 701 contained in the second embodiment. For illustration expediency, the right-hand side of the figure is connected to the SCSI bus 601 and the left-hand side thereof to an internal bus 1815. That is, the construction of FIG. 7 is mirrored crosswise in FIG. 8. The SCSI bus control circuit 701 is roughly divided into function blocks 841, 842 and 843 indicated by broken lines.

In FIG. 8, an internal CPU data bus 801 is used by the CPU 1806 to gain access to the SCSI bus control circuit 701. Part of an internal bus 15 is connected to the data bus 801. A read/write controller 802 uses such signals as RD/, WR/, CS/, DACK/ and DREQ output by the CP 1806 and the hard disk controller 1811 in order to access internal registers 803 through 811, 815 through 818 and an FIFO 819 inside the SCSI bus control circuit 701. In this specification, the symbol "/" following a signal name means an inverted signal. Of the internal registers provided, 803 is a transfer count register, 804 a destination ID register, 805 a command register, 806 a configuration-1 register, 807 a configuration-2 register, 808 a synchronous offset register, 809 a synchronous transfer period register, 810 a time-out register, and 811 a clock conversion register. By setting values to these registers, the CPU 1806 controls the SCSI protocol.

Reference numeral 812 is an SCSI data bus single-ended receiver; 813 is an SCSI data bus single-ended 48 mA sink driver; 814 is an SCSI bus control signal single-ended receiver; and 824 is an SCSI bus control signal single-ended 48 mA sink driver. Reference numeral 815 is a transfer counter; 816 is a status counter; 817 is an interrupt register; and 818 is a sequence step counter. By reading these registers, the CPU 1806 knows the status of SCSI protocol execution.

FIFO's 819 and 820 are capable of temporarily storing the data transferred from the CPU 1806 or buffer 1813 to the SCSI bus, or from the SCSI bus or buffer 1813 to the CPU 1806. A parity generator and checker 821 deals with the data transferred from the CPU 1806 or buffer 1813 to the SCSI bus, or from the SCSI bus to the CPU 1806 or buffer 1813. A sequencer 823 controls the SCSI protocol in accordance with the settings in the registers 803 through 811 and with the SCSI bus control signal value given by the receiver 814. Thereafter, the sequencer 823 outputs the result of the processing to the status register 816 and interrupt register 817.

An ID recognition part 825 is a key block in the second embodiment. This part 825, contained in the function block 841, corresponds to the ID recognition part 603 acting as the access start detecting means shown in FIG. 6. The ID recognition part 825 monitors the values of SCSI bus control signals BSY/ and SEL/. When the BSY/ is brought High and the SEL/ Low, the part 825 compares an own-ID, which is the ID of the second embodiment, with the value of an SCSI data bus SDB0/-SDB7/. If there is a match between the two values, a sleep leave signal 833 is output.

A sleep control circuit 826 asserts sleep control signals 828 and 829 as well as a sleep signal 827 upon receipt of a sleep set signal 830 given by the sequencer 823. On receiving a sleep leave signal 833 from the ID recognition part 825, the sleep control circuit 826 negates the sleep control signals 828 and 829 along with the sleep signal 827. A clock signal 834 is AND'ed with the sleep control signal 828 for use by the function block 842, and AND'ed with the sleep control signal 829 for use by the function block 843.

A current control circuit 835 acts as power dissipation controlling means. The circuit 835 comprises a switch 836 and a power supply Vcc. The switch 836 is controlled by the sleep signal 837 given by the CPU 1806. The current control circuit 835 supplies currents independently to the ID recognition part 825, to the sleep control circuit 826, to a power supply Vcc2 that furnishes currents to the function block 841 made of receivers 812 and 814, and to a power supply Vcc1 that feeds currents to the function blocks 842 and 843. Specifically, the current control circuit 835 controls the switch 830 in such a way that the power supply Vcc1 is activated upon receipt of the sleep signal 837 from the CPU 1806, and is deactivated given the sleep signal 833 by the ID recognition part 825.

Figure 11:
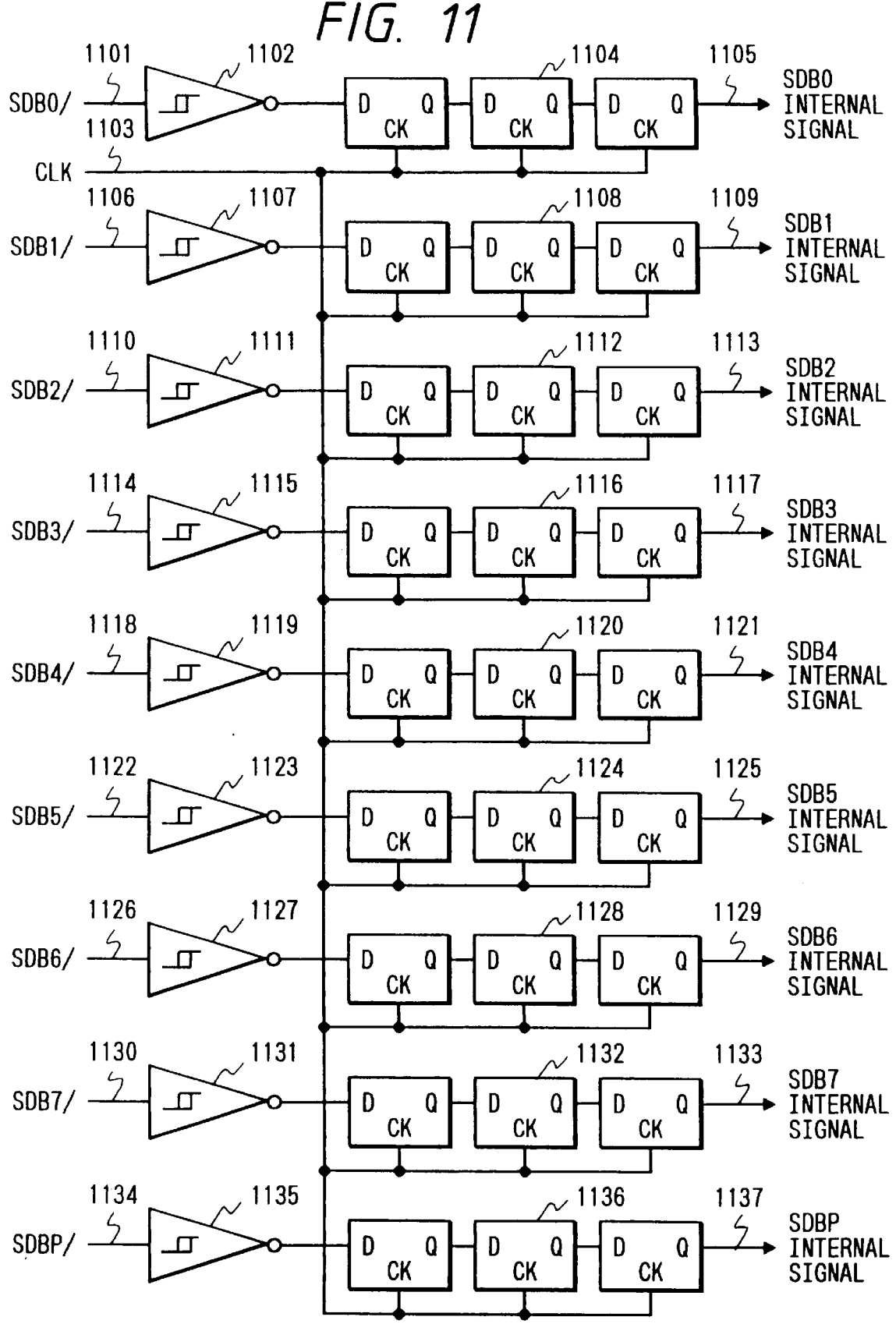
FIG. 11 is a circuit diagram of a receiver 812 in the SCSI bus control circuit of FIG. 8.
Figure 12:
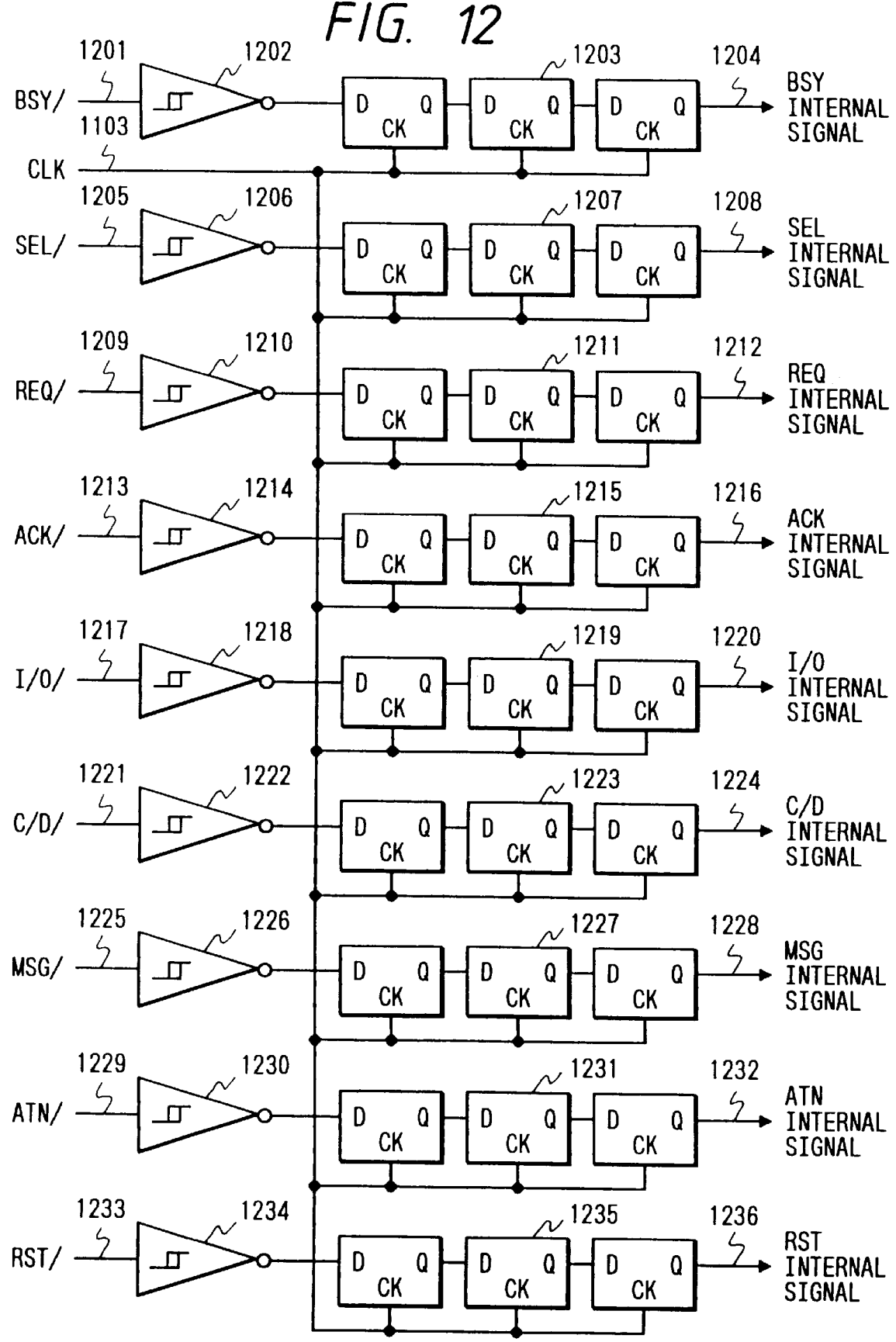
FIG. 12 is a schematic overall circuit diagram of the receiver 814.

FIGS. 11 and 12 schematically show the constructions of the receivers 812 and 814, respectively. As depicted in FIG. 11, the receiver 812 is made of receivers with hysteresis 1102, 1107, 1111, 1115, 1119, 1123, 1127, 1131 and 1135 which respectively receive signals SDBO/through SDB7/ (1101, 1106, 1110, 1114, 1118, 1122, 1126, 1130) and SDBP/(1134), and of three-stage synchronizers 1104, 1108, 1112, 1116, 1120, 1124, 1128, 1132 and 1136 which respectively synchronize the signals output by these receivers according to a clock signal 1103 (equivalent to the clock signal 834 in FIG. 8). The three-stage synchronizers 1104 through 1136 output internal signals SDB0 through SDBP (1105 through 1137).

The receiver 814 is basically constituted, as shown in FIG. 12, by receivers with hysteresis 1202, 1206, 1210, 1214, 1218, 1222, 1226, 1230 and 1234 which respectively receive SCSI control bus signals BSY/(1201), SEL/(1205), BEQ/(1209), ACK/(1213), I/O/(1217), C/D/(1221), MSG/ (1225) ATN/(1229) and RST/(1233), and by three-stage synchronizers 1203, 1207, 1211, 1215, 1219, 1223, 1227, 1231 and 1235 which respectively synchronize the output signals from these receivers according to the clock signal 1103. (For the functions of the above input signals, reference should be made to the SCSI Protocol Specification mentioned earlier.) The three-stage synchronizers 1203 through 1235 respectively output internal signals BSY (1204), SEL (1208), RE (1212), ACK (1216), I/O (1220), C/D (1224), MSG (1228), ATN (1232) and RST (1236).

As shown in FIG. 8, the receiver 814 of the second embodiment receives the sleep signal 827 from the sleep control circuit 826. In order to address the sleep signal 827, the receiver 814 has the receiver circuit construction of FIG. 10 which accepts the signals REQ/(1209), /ACK/(1213), I/O/(1217), C/D/(1221), MSG/(1225), ATN/(1229) and RST/(1233). While FIG. 10 indicates only the receiver circuit part corresponding to the signal MSG/(1225), the same structure applies to the other signals REQ, (1209), ACK/(1213). I/O/(1217), C/D (1221), ATN/(1229) and RST/ (1233) as well.

As described, the sleep signal 827 is a signal that places the function blocks 843 and 842 in sleep mode. When the sleep signal 827 is activated, the circuit of FIG. 10 keeps the internal signals REQ (1212) through RST (1236) deactivated regardless of the values of the signals REQ/(1209), ACK/(1213), I/O /(1217), C/D/(1221), MSG/(1225), ATN/ (1229) and RST/(1233). The operations of an inverter circuit 1001, a two-input NOR circuit 1002 and a two-input OR circuit 1003 contained in FIG. 10 will be described later.

Figure 10:
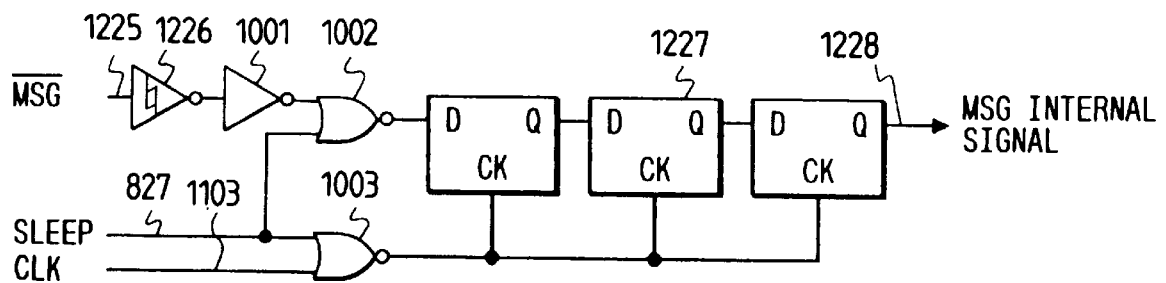
FIG. 10 is a partial circuit diagram of a receiver 814 contained in the SCSI bus control circuit of FIG. 8.

The receiver circuit parts corresponding to the signals BSY/(1201) and SEL/(1205) keep their arrangements as shown in FIG. 12 throughout. The reason for this is that these signals are needed for ID recognition of the SCSI protocol and must be functional at all times. Because the other signals are not needed for ID recognition of the SCSI protocol the parts corresponding to these signals are constructed as shown in FIG. 10, i.e. controlled by the sleep signal 827.

Figure 9:
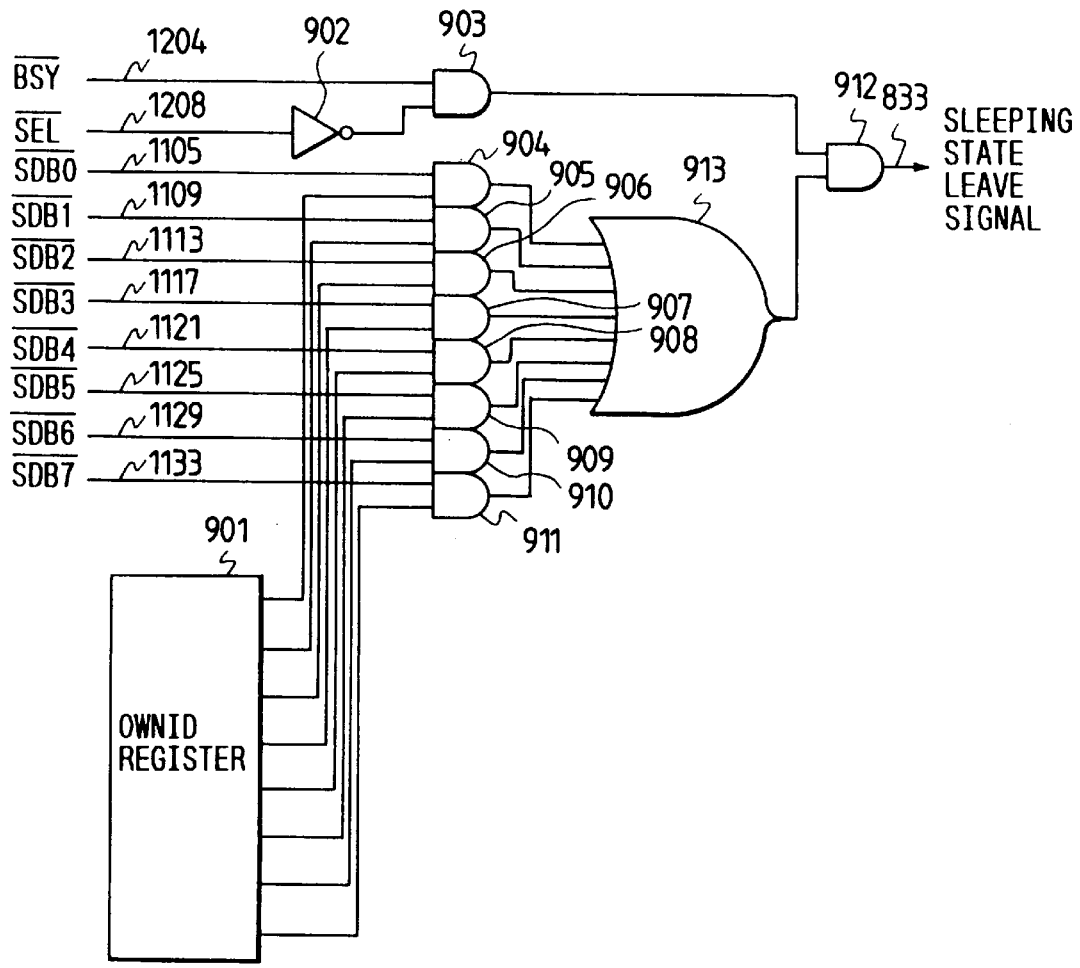
FIG. 9 is a circuit diagram of an ID recognition part 825 included in the SCSI bus control circuit shown in FIG. 8.

Referring to FIG. 9, how the ID recognition block 825 in FIG. 8 is constructed will now be described. The ID recognition part 825 receives the internal signals BSY (1204) and SEL (1208) from the receiver 814 and SDBO through SDB7 (1105–1133) from the receiver 812. The sleep leave signal 833 is output by the ID recognition part 825. In FIG. 9, reference numeral 901 is an own-ID register for retaining the ID of the SCSI system that is the second embodiment; 902 is an inverter; 903 through 912 are two-input AND circuits; and 913 is an eight-input OR circuit. How the ID recognition part 825 works will be described later in more detail.

A typical construction of the sleep control circuit 826 in FIG. 2 will now be described with reference to FIG. 13. As depicted in FIG. 8, the sleep control circuit 826 receives the sleep leave signal 833 from the ID recognition part 825 and the sleep set signal 830 from the sequencer 823. The sleep control circuit 826 outputs two signals: sleep control signal 828 that places the function block 843 of the SCSI bus control circuit 703 in sleep mode, and sleep control signal 829 that places the function block 842 in sleep mode.

Figure 13:
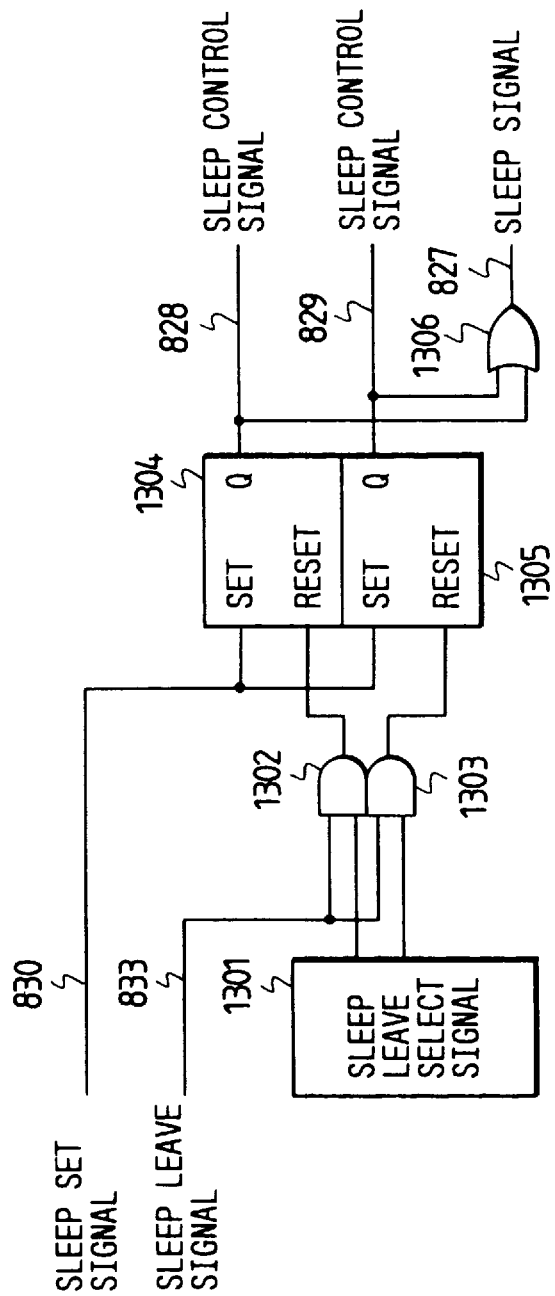
FIG. 13 is a circuit diagram of a sleep control circuit 826 in the SCSI bus control circuit of FIG. 8.

In FIG. 13, reference numeral 1301 is a sleep leave select register; 1302 and 1303 are two-input AND gates; 1304 and 1305 are set/reset latch circuits that retain the sleep control signals 828 and 829 respectively; and 1306 is a two-input OR gate.

The description of the operation of the second embodiment continues with reference to FIG. 8. Prior to describing how the key parts of the embodiment work, a typical SCSI sequence will be discussed with reference to FIGS. 17A, 17B and 17C. The SCSI system is made of an initiator that issues commands and of target peripheral equipment. The initiator may be the host computer such as the main CPU 14 shown in FIG. 3; the target peripheral equipment may be the file controller 17 illustrated in FIG. 3.

Figure 17A:
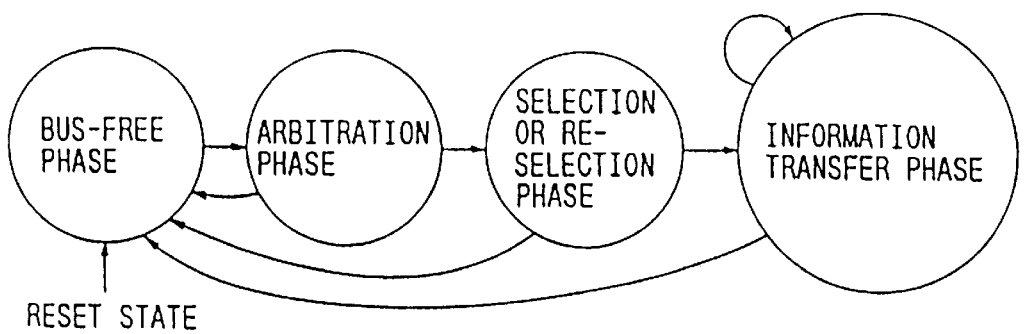
FIGS. 17A, 17B and 17C are views depicting an overall sequence of the SCSI protocol for an SCSI system to which the second and the third embodiments of the invention are applied.
Figure 17B:
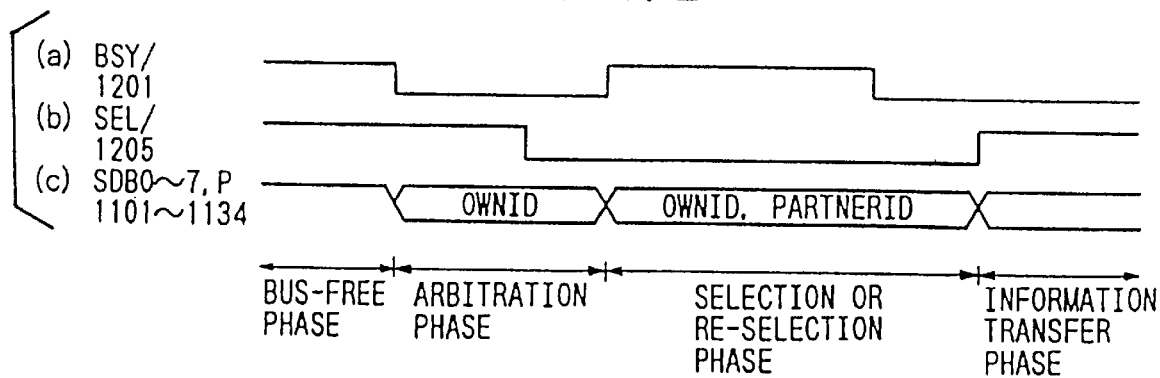
Figure 17C:
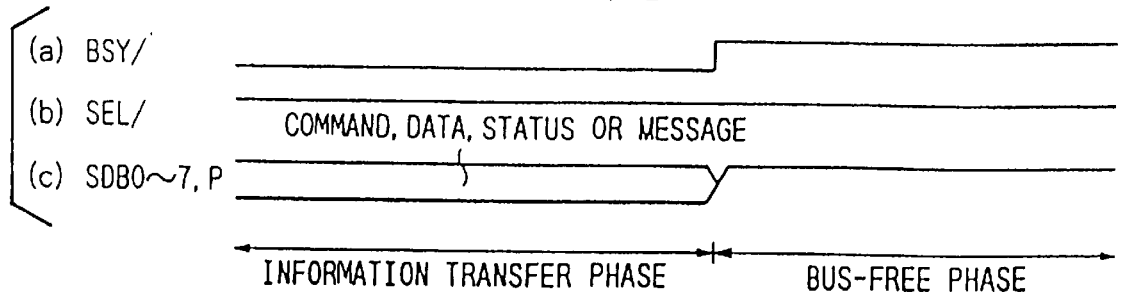

As depicted in FIG. 17A, the SCSI system enters a bus free phase after being reset by the initiator. The bus free phase is a state in which the SCSI bus is used by none of the SCSI systems configured. As shown in FIG. 17B, the SCSI system in the bus free phase negates the signals BSY/(1201), SEL/(1205), SDBO/through SDB7/(1101–1130) and SDB/ (1134), i.e., holds these signals at the high level. The initiator then starts an arbitratiokn phase in order to acquire the right to use the bus. That is, the initiator asserts the signal BSY/(1201) and outputs its own ID (i.e., initiator's device number) to SDBO/through SDB7/(1101–1130) and SDBP (1134). Checking the ID's on the SCSI bus in the arbitration phase, the initiator acquires the right to use the bus if its own ID is found to be the highest priority ID on the bus. With the bus right acquired, the initiator asserts the signal SEL/ (1205).

The initiator then starts a selection phase in order to select the target equipment to which to issue a command. That is, the initiator negates the signal BSY/ (1201) and outputs a partner ID (i.e., target equipment's number) to SDBO/ through SDB7/(1101–1130) and SDBP/ (1134) in addition to the own-ID. When the target equipment finds that the signal BSY/(1201) is negated and the signal SEL/(1205) asserted, the target equipment compares the ID on the SCSI bus with the target's own ID.

If the ID on the SCSI bus is found to match the target equipment's own ID, the target equipment responds to the initiator by asserting the signal BSY/(1201). After verifying that the signal BSY/(1201) is asserted, the initiator negates the signal SEL/(1205) and terminates the selection phase, With the selection phase ended, the SCSI system enters an information transfer phase. In the information transfer phase, the initiator connected to the target equipment exchanges commands, data, messages and status therewith.

When all commands, data, messages and status have been exchanged, the target equipment negates the signal BSY/ (1201) and enters a bus free phase. Even if the exchange of all commands, data, messages or status is not complete, the target equipment may negate the signal SSY/(1201) and enter the bus free phase past a certain time limit. In that case, with the internal processing ended, the target equipment may start an arbitration phase and select the initiator in a re-selection phase to resume the interrupted exchange of the commands, data, messaes and status. Where initiators add a queue tag message to each of the commands to be transferred to the target equipment, the target equipment may accept commands simultaneously from a plurality of initiators.

In a conventional arrangement, NCR's SCSI Control LSI 53C90A or 53C90B in an access wait state has all signals on the SCSI bus kept monitored by receivers and checked by a sequencer. The arrangement allows the LSI to check that the signal BSY/is negated and the SEL/asserted, thereby taking the ID on the SCSI bus into an PIFO for comparison with the own ID by the sequencer. This constitutes the operation of the selection phase mentioned above. Thus even in a state in which commands are awaited from an initiator, the whole SCSI bus control circuit including the sequencer and other internal circuits remains active. This necessarily promotes power dissipation.

The description of the operation of the second embodiment is continued. When the CPU 1806 of FIG. 7 has executed all commands given by the SCSI bus 601, exhausting the command queue defined by the SCSI protocol, the CPU outputs the sleep signal 837 to the power control circuit 835. In turn, tie power control circuit 835 deactivales the power supply Vcc1 and enters sleep mode, cutting off power to all circuits in the function blocks 842 and 843 of the SCSI bus control circuit 701 but not to those in the function block 841 thereof, the block 841 comprising the ID recognition part 825, sleep control circuit 826, receivers 812 and 814, and two two-input AND circuits.

As shown in FIGS. 10 and 12, the receiver 814 of the second embodiment has all its input circuits except for the BSY/(1201) and SEL/(1205) circuits receive the sleep signal 827. When the sleep signal 827 is at the high level in sleep mode, the output of the two-input NOR circuit 1002 (FIG. 10) remains fixed at the low level. The output of the two-input OR circuit 1003 is held fixed at the high level. Thus the internal signal 1228 remains unchanged (i.e., fixed at the low level) even when the signal MSG/(1225) varies on the SCSI bus. Generally, these circuits are made of CMOS's, which means that they dissipate no currents if the signals associated therewith stay unchanged. Thus in sleep mode, the receiver 814 does not dissipate currents except in the BSY/(1201). and SEL/(1207) input circuits thereof.

When the SCSI bus goes into an arbitration phase and on to a selection phase, the signal BSY/(1201) is brought High and the SEL/(1205) brought Low. Since the ID recognition part 825 is structured as shown in FIG. 9, the output of the inverter 902 and that of the two-input AND gate 903 are brought High each. If the ID retained in the own-ID register 901 is found to match the value in SDBO/through SDB7/ (1105–1133), the sleep leave signal 833 is brought High.

If the own-ID is set to "3," and the signal SDB3/(1114) is at the low level, then the internal signal SDB3 (1117) is brought High and the output of the two-input ANI) circuit 908 is also brought High. It follows that the output of the eight-input OR circuit 913 is brought High. Thus the output of the two-input AND circuit 912 is brought High, which renders High the sleep leave signal acting as the access start signal. As a result, the current control circuit 835 activates the power supply Vcc1 to power the function blocks 843 and 842.

Meanwhile, the sleep control circuit 826, constructed as shown in FIG. 13, resets the sleep mode latches 1304. and 1305 as per the value in the sleep leave select register 1301 when the sleep leave signal 833 is brought High. This causes the sleep control signals 828 and 829 to be negated. The sleep control signal 828 places only the sequencer 823, the parity generator and checker 821 and the FIFO 819 in sleep mode. The sleep control signal 829 places into sleep mode the circuits within the SCSI bus control circuit 701 other than those controlled by the sleep control signal 828. For example, with the sleep leave select register 1301 containing a value of 10, the output of the two-input AND circuit 1302 is brought High and the output of the two-input AND circuit 1303 brought Low when the sleep leave signal 833 goes High.

In this manner, the sleep mode latch 1304 is reset while the sleep mode latch 1305 remains set. Consequently, the sleep control signal 828 is brought Low and the sleep control signal 829 brought High. Thus only the sequencer 823, the parity generator and checker 821 and the FIFO 819 leave their sleep mode. The sequencer 823 has the parity generator and checker 821 check to see if no partly error has occurred. With no ID error detected, the sequencer 823 allows the other circuits to leave their sleep mode. In case a parity error or an ID error is found, the sequencer 823, the parity generator and checker 821 and the FIFO 819 again enter sleep mode. This is the reason why the function blocks 842 and 843 of the second embodiment are controlled by the separate control signals 829 and 828.

The CPU 1806 waits for an interrupt signal from the SCSI bus control circuit 701 for a predetermined period of time. If no interrupt signal comes in during that period, the CPU 1806 again outputs the sleep signal 837 to the power control circuit 835, cutting off power to all circuits of the SCSI bus control circuit 701 except for the function block 841 thereof.

As described, the first and the second embodiments of the invention permit the peripheral equipment control device or LSI to minimize its current dissipation in command wait state without hampering its response character teristic.

Figure 14:
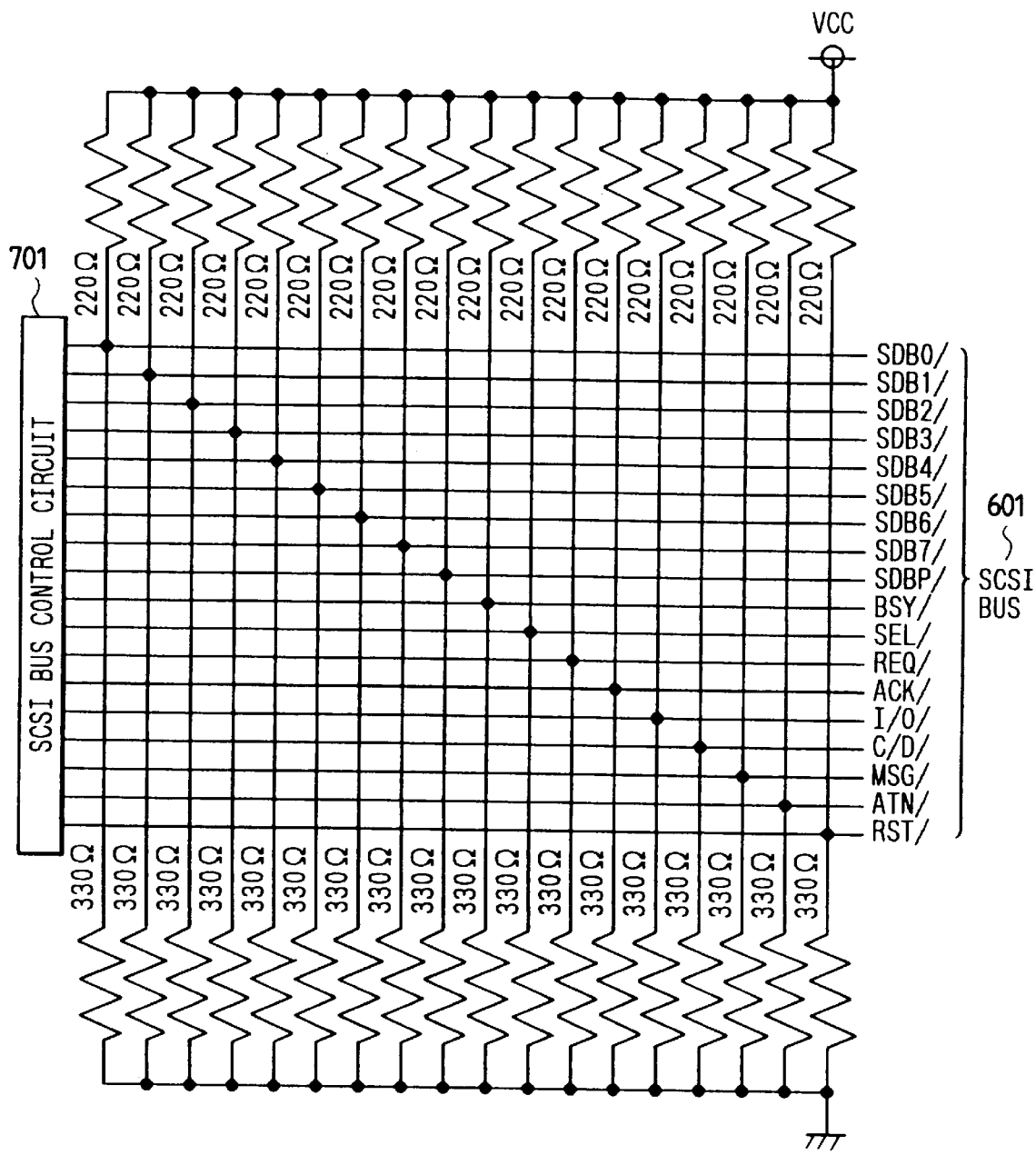
FIG. 14 is a circuit diagram describing a terminator arrangement of an SCSI bus to which the invention is applied.

Described below is the third embodiment of the invention with reference to FIGS. 14 through 16. Generally, the SCSI bus uses a 48 mA sink open collector arrangement or open drain driver arrangement. This makes it necessary, as shown in FIG. 14, to provide each signal line of the SCSI bus with terminators of 220 Ω and 330 Ω even in systems whose scope makes the effect of the reflection involved virtually negligible. The terminators always carry a current of 164 mA (=5 V/550 Ω×18).

Figure 15:
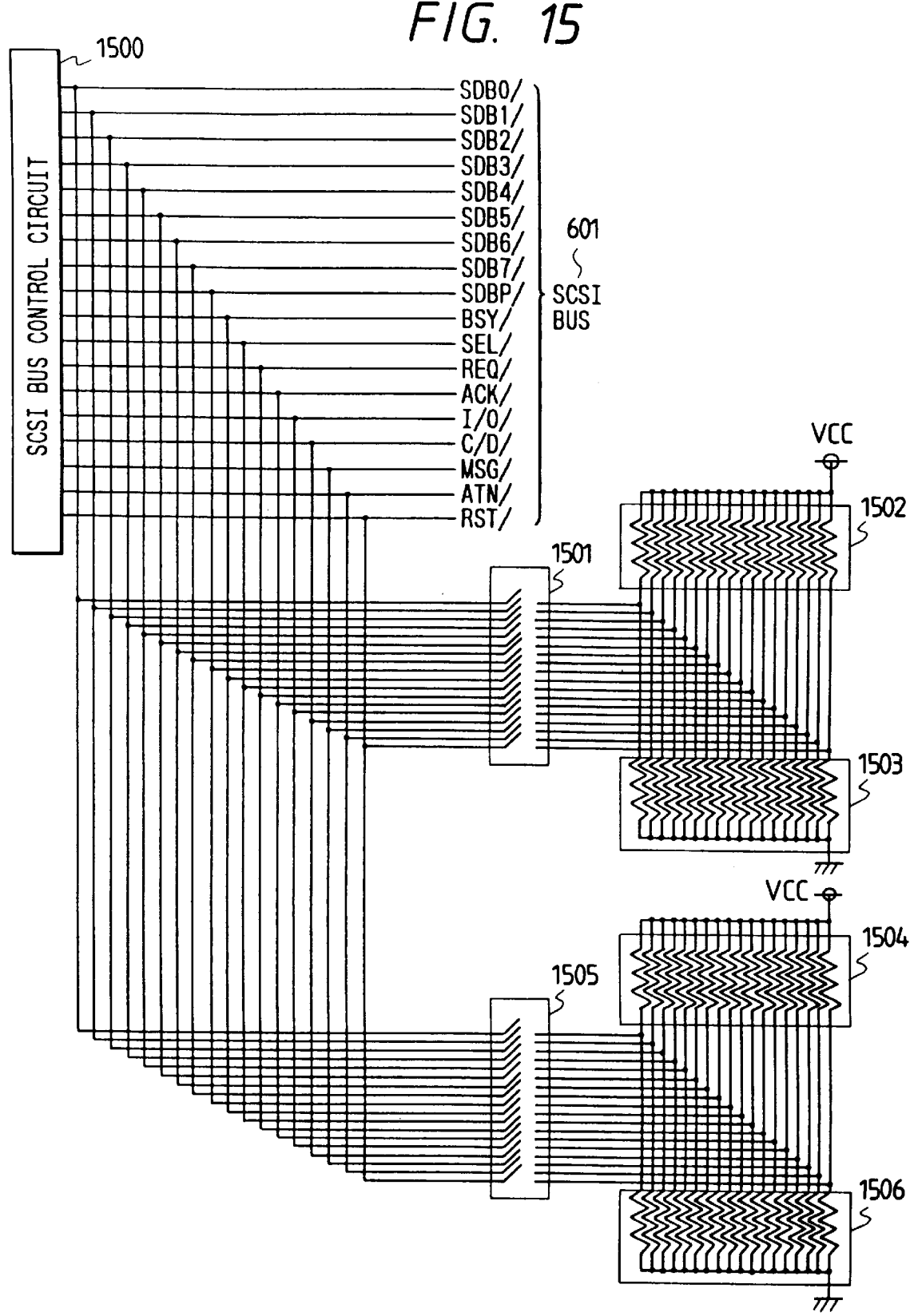
FIG. 15 is a circuit diagram of an SCSI bus practiced as a third embodiment of the invention.

The third embodiment, as depicted in FIG. 15, comprises an SCSI bus control circuit 1500, the SCSI bus 601, 18 220 Ω resistances 1502, 18 330 Ω resistances 1503, 18 440 Ω resistances 1504, 18 660 Ω resistances 1506, and switches 1501 and 1505.

Figure 16:
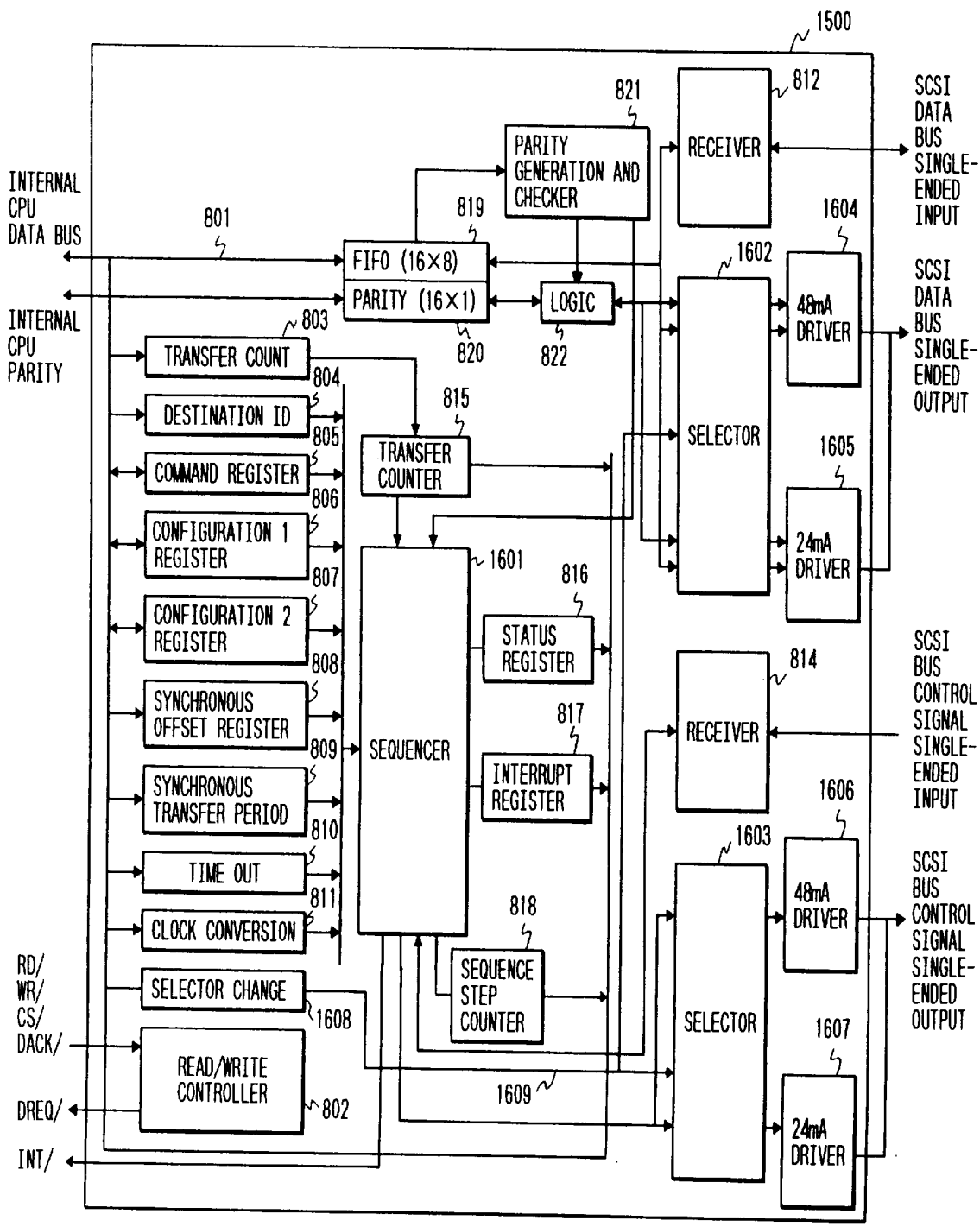
FIG. 16 is a block diagram of an SCSI bus control circuit for use with the third embodiment.

The SCSI bus control circuit 1500 in the third embodiment is constructed as shown in FIG. 16. In FIG. 16, the external CPU data bus 801 is a data bus that allows the CPU 1806 (FIG. 7) to access the SCSI bus control circuit 1500. Of the parts in FIG. 16, those having the same functions as their counterparts in FIG. 8 are designated by like reference numerals and any detailed description thereof will be omitted. Reference numeral 1601 is a sequencer that controls the SCSI bus control circuit 1500; 1602 and 1603 are selectors; 1604 and 1606 are SCSI data bus single-ended 48 mA sink drivers corresponding to the drivers 813 and 824 described earlier; and 1605 and 1607 are SCSI data bus single-ended 24 mA sink drivers. The selectors 1602 and 1603 are intended to switch between the 48 mA sink drivers 1604 and 1606 on the one side, and the 24 mA sink drivers 1605 and 1607 on the other, as will be described later. A selector changeover register 1608 is used to retain selector changeover information written thereto by the CPU 1806. In connection with the hard disk drive of FIG. 7, not shown in FIG. 16, the third embodiment has no need for the power control circuit 703; instead the embodiment functionally includes a bit switch as means for feeding selector changeover information to the CPU 1806.

How the third embodiment operates will now be described. A bit switch operation by a user causes the CPU 1806 to send a control signal to the SCSI bus control circuit 1500. On receiving the control signal, the SCSI bus control circuit 1500 selects either the 48 mA sink drivers or the 24 mA sink drivers using the selectors 1602 and 1603. Specifically, the CPU 1806 receives the bit switch value and writes that value to the selector changeover register 1608 using the internal CPU data bus 801. In accordance with the value, the selector changeover register 1608 sends a selector changeover signal 1609 to the selectors 1602 and 1603.

For example, assume a relatively large system configuring eight SCSI systems, one of which is depicted structurally in FIG. 16. With this system, the external CPU 1806 writes to the selector changeover register 1608 the value of the bit switch changed by the user over to the 48 mA sink drivers. According to that value, the selector changeover register 1608 controls the control signal 1609 so that the selectors 1602 and 1603 select the 48 mA sink drivers 1604 and 1606.

Referring to FIG. 15, the user connects the switch 1501 and disconnects the switch 1505. This provides an SCSI bus driver configuration that complies with the SCSI protocol, accommodating up to eight SCSI systems over a maximum bus length of six meters. When all terminals are asserted, however, currents of 864 mA (=48 mA×18) are dissipated; when all terminals are negated, the current dissipation is 164 mA.

Next, assume a relatively small system such as a A4-size lap-top computer in which the effect of the reflection involved is negligible. In that case, the 48 mA sink drivers are not needed. Thus the external CPU 1806 causes the selector 1602 and 1603 to select the 24 mA sink drivers in accordance with the bit switch changed over to these drivers. The user connects the switch 1505 of FIG. 15 and disconnects the switch 1501. The settings permit the SCSI bus driver arrangement to be configured using the 24 mA sink drivers. With all terminals asserted, the current dissipation is 432 mA (=24 mA×18); with all terminals negated, the current dissipation is 82 mA. This means that the current dissipation is about half of what it is when the 48 mA sink drivers are employed.

Because the SCSI control LSI as the third embodiment comprises both the SCSI bus drivers of small lead-in currents and the 48 mA sink SCSI bus drivers, the two kinds of drivers may each be used for suitable purposes. That is, the 48 mA sink SCSI bus drivers may be used for ordinary SCSI systems, while the SCSI bus drivers of small lead-in currents may be used for small-scale SCSI systems wherein the effect of reflection is negligible. This scheme lowers the current dissipation when each of the terminals is asserted. Where the SCSI bus drivers of small lead-in currents are used, terminators may be suitably selected to address the lead-in currents. This means a higher resistance value of the terminators in effect than when the 48 mA sink SCSI bus drivers are used in conjunction with 220 Ω and 330 Ω terminators. As a result, the current dissipation, with each terminal negated, is reduced for small-scale SCSI systems wherein the effect of reflection is negligible.

As described, the SCSI system in the third embodiment can switch optimally between the SCSI bus drivers of small lead-in currents and the 48 mA sink SCSI bus drivers. When the SCSI bus drivers of small lead-in currents are used, appropriate terminators addressing the lead-in currents are connected; when the 48 mA sink SCSI bus drivers are employed, terminators of 220 Ω and 330 Ω are connected. This makes it possible to select optimum SCSI bus drivers depending on the application, whereby the current dissipation involved is minimized.

While preferred embodiments of the invention have been described using specific terms, such description is for illustrative purposes only, and it is to be understood that changes and variations may be made without departing from the spirit or scope of the following claims.

What is claimed is:

1. A storage apparatus connected to a bus which is connected to a processor, the storage apparatus comprising:
   a storage medium; and
   a controller which controls access to the storage medium from the processor,
   wherein the controller has an active mode in which the controller processes commands which include at least one of a read access and a write access from the processor to the storage medium via the bus and a sleep mode in which the controller receives from the processor the commands for accessing the storage medium, the controller consuming less power in the sleep mode than when in the active mode,
   wherein the controller changes state from the sleep mode to the active mode, in which at least either one of the read access and the write access from the processor to the storage medium is enabled, in response to the commands received by the controller while in the sleep mode, and
   wherein the controller changes state from the active mode to the sleep mode in response to completion of an execution of either one of the read access and the write access from the processor to the storage medium.

2. A storage apparatus according to claim 1, wherein the controller changes state directly from the sleep mode to the active mode in response to the commands received by the controller while in the sleep mode and executes at least the read access from the processor to the storage medium while in the sleep mode.

3. A storage apparatus according to claim 2, wherein the controller is supplied with a power supply voltage in the sleep mode as well as in the active mode.

4. A storage apparatus according to claim 3, wherein the controller has at least a first digital circuit and a second digital circuit,
- wherein the first digital circuit receives the commands from the processor in the sleep mode, and outputs an output signal responsive to the commands received,
- wherein in the sleep mode internal clocks are stopped to be supplied with the second digital circuit so that the second digital circuit stops operation, and
- wherein the second digital circuit changes state from the sleep mode to the active mode by receiving the output signal.

5. A storage apparatus according to claim 2, wherein the controller has at least a first digital circuit and a second digital circuit,
- wherein the first digital circuit receives the commands from the processor in the sleep mode, and outputs a signal responsive to the commands received,.
- wherein in the sleep mode internal clocks are stopped to be supplied with the second digital circuit so that the second digital circuit stops operation, and
- wherein the second digital circuit changes state from the sleep mode to the active mode by receiving the output signal.

6. A storage apparatus according to claim 1, wherein the controller is supplied with a power supply voltage in the sleep mode as well as in the active mode.

7. A storage apparatus according to claim 6, wherein the controller has at least a first digital circuit and a second digital circuit,
- wherein the first digital circuit receives the commands from the processor in the sleep mode, and outputs an output signal responsive to the commands received,
- wherein in the sleep mode internal clocks are stopped to be supplied with the second digital circuit so that the second digital circuit stops operation, and
- wherein the second digital circuit changes state from the sleep mode to the active mode by receiving the output signal.

8. A storage apparatus according to claim 1, wherein the controller has at least a first digital circuit and a second digital circuit,
- wherein in the sleep mode the first digital circuit receives the commands from the processor, and outputs an output signal responsive to the commands received,
- wherein in the sleep mode internal clocks are stopped to be supplied with the second digital circuit so that the second digital circuit stops operation, and
- wherein the second digital circuit changes state from the sleep mode to the active mode upon receiving the output signal.

9. A storage apparatus according to claim 1, wherein the controller is maintained in the active mode when, the controller receives a next read access or a next write access within a predetermined time period following completion of the execution of either the read access or the write access.

10. A storage apparatus, connected to a bus which is connected to a processor, the storage apparatus comprising:
a storage medium; and
a controller which controls access to the storage medium from the processor,
wherein the controller has an active mode in which the controller processes commands which include at least one of a read access and a write access from the processor to the storage medium via the bus and a sleep mode in which the controller receives from the processor the commands for accessing the storage medium, the controller consuming less power in the sleep mode than when in the active mode,
wherein the controller changes state from the sleep mode to the active mode, in which at least either one of the read access and the write access from the processor to the storage medium is enabled, in response to the commands received by the controller while in the sleep mode, and
wherein the controller changes state from the active mode to the sleep mode in response to completion of an execution of the access enabled by the commands from the processor to the storage medium.

11. A storage apparatus according to claim 10, wherein the controller changes state directly from the sleep mode to the active mode in response to the commands received by the controller while in of the sleep mode and executes at least the read access from the processor to the storage medium while in the sleep mode.

12. A storage apparatus according to claim 11, wherein the controller is supplied with a power supply voltage in the sleep mode as well as in the active mode.

13. A storage apparatus according to claim 12, wherein the controller has at least a first digital circuit and a second digital circuit,
- wherein the first digital circuit receives the commands from the processor in the sleep mode, and outputs an output signal responsive to the commands received,
- wherein in the sleep mode internal clocks are stopped to be supplied with the second digital circuit so that the second digital circuit stops operation, and
- wherein the second digital circuit changes state from the sleep mode to the active mode by receiving the output signal.

14. A storage apparatus according to claim 11, wherein the controller has at least a first digital circuit and a second digital circuit,
- wherein the first digital circuit receives the commands from the processor in the sleep mode, and outputs an output signal responsive to the commands received,
- wherein in the sleep mode internal clocks are stopped to be supplied with the second digital circuit so that the second digital circuit stops operation, and
- wherein the second digital circuit changes state from the sleep mode to the active mode by receiving the output signal.

15. A storage apparatus according to claim 10, wherein the controller is supplied with a power supply voltage in the sleep mode as well as in the active mode.

16. A storage apparatus according to claim 15, wherein the controller has at least a first digital circuit and a second digital circuit,
- wherein the first digital circuit receives the commands from the processor in the sleep mode, and outputs an output signal responsive to the commands received, wherein in the sleep mode internal clocks are stopped to be supplied with the second digital circuit so that the second digital circuit stops operation, and wherein the second digital circuit changes state from the sleep mode to the active mode by receiving the output signal.

17. A storage apparatus according to claim 10, wherein the controller has at least a first digital circuit and a second digital circuit, wherein in the sleep mode the first digital circuit receives the commands from the processor, and outputs an output signal responsive to the commands received, wherein in the sleep mode internal clocks are stopped to be supplied with the second digital circuit so that the second digital circuit stops operation, and wherein the second digital circuit changes state from the sleep mode to the active mode upon receiving the output signal.

18. A storage apparatus according to claim 10, wherein the controller is maintained in the active mode, when the controller receives a next access within a predetermined time period following completion of the execution of the access.

\* \* \* \* \*